United States Patent [19]
Pollet

[11] Patent Number: 5,555,807
[45] Date of Patent: Sep. 17, 1996

[54] DEVICE FOR PROVIDING A TEMPORARY FLUIDIC COUPLING

[75] Inventor: Alphonse Pollet, Sarcelles, France

[73] Assignees: Heidelberger Druckmaschinen AG, Heidelberg, Germany; Heidelberg Harns S.A., Montataire, France

[21] Appl. No.: 293,990

[22] Filed: Aug. 22, 1994

[30] Foreign Application Priority Data

Aug. 20, 1993 [FR] France ................... 93 10144

[51] Int. Cl.⁶ .................... B41F 27/06; B41L 29/06
[52] U.S. Cl. ........................................... 101/415.1
[58] Field of Search ................... 101/415.1, 378; 285/9.2, 101; 137/580, 798, 614, 614.01, 614.03; 279/4.01, 904, 900, 4.04, 4.03; 403/14

[56] References Cited

U.S. PATENT DOCUMENTS

| | | | |
|---|---|---|---|
| 3,201,151 | 8/1965 | Westveer | 285/73 |
| 3,715,981 | 2/1973 | Huffman | 101/415.1 |
| 3,727,551 | 4/1973 | Kostas et al. | 101/415.1 |
| 4,726,397 | 2/1988 | Stich | 285/101 |
| 5,063,964 | 11/1991 | Onishi et al. | 137/614.03 |
| 5,309,832 | 5/1994 | Merkel et al. | 101/216 |

FOREIGN PATENT DOCUMENTS

| | | |
|---|---|---|
| 0516260A1 | 12/1992 | European Pat. Off. . |
| 2147482 | 3/1973 | France . |
| 2126941 | 11/1972 | Germany . |
| 58-138651 | 8/1983 | Japan . |

Primary Examiner—J. Reed Fisher
Attorney, Agent, or Firm—Kenyon & Kenyon

[57] ABSTRACT

A device for temporary fluidic coupling between a source of pressurized fluid and a user member includes a supplied end-fitting and a supply end-fitting, at least temporarily placed face to face in a given longitudinal direction and connected respectively to the user member and to the source of pressurized fluid, wherein the supply end-fitting includes a retractable seal in the form of a longitudinal tubular piston which, when it is urged by the pressurized fluid, passes from a retracted rest position to an active position in which it is applied against a transverse annular face of the supplied end-fitting to connect the respective pipes in a sealed manner, and which resumes its retracted rest position when it is no longer urged by the pressurized fluid.

8 Claims, 13 Drawing Sheets

FIG. 16
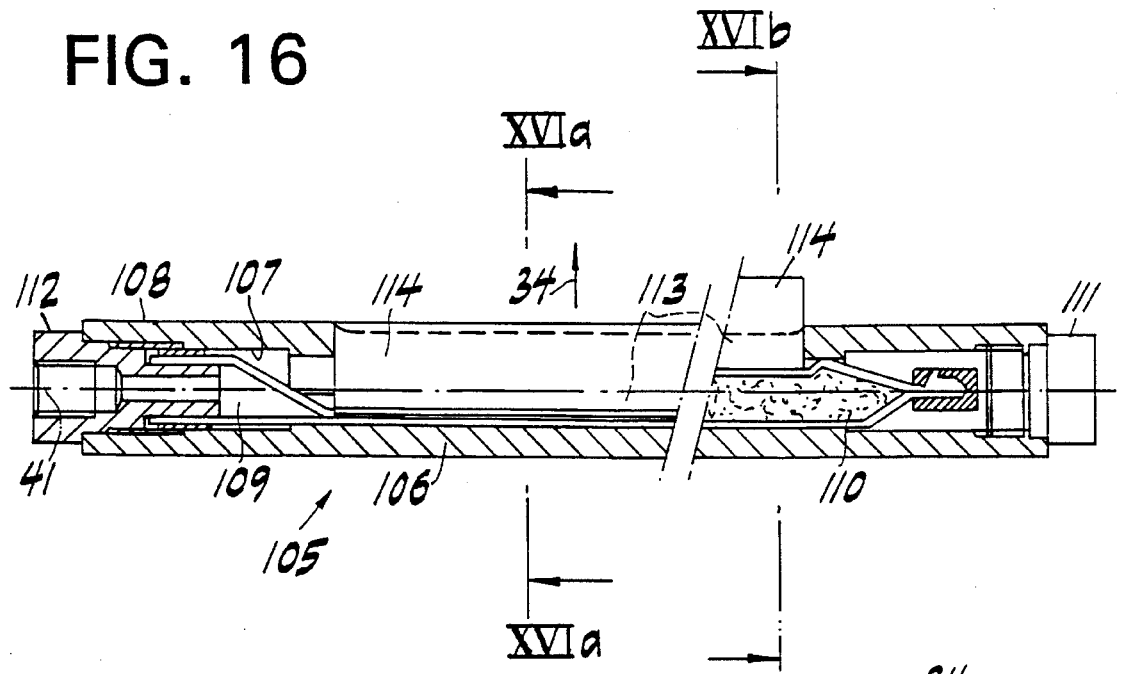
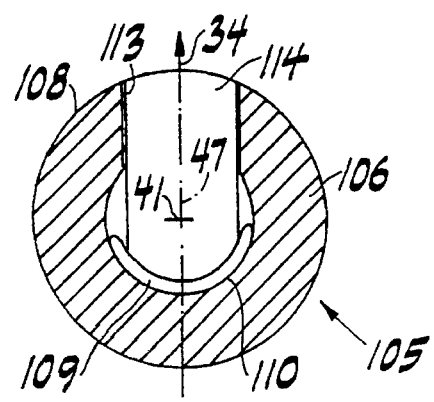
FIG. 16A
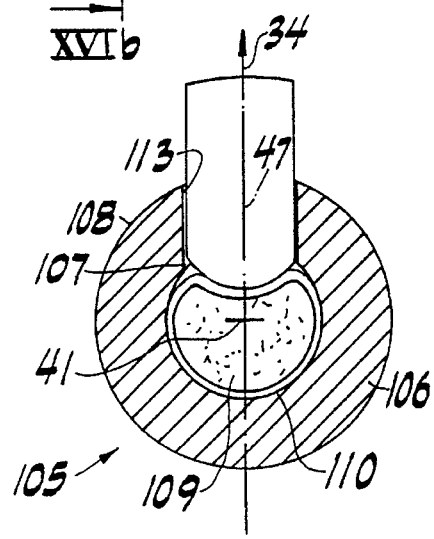
FIG. 16B

DEVICE FOR PROVIDING A TEMPORARY FLUIDIC COUPLING

FIELD OF THE INVENTION

The present invention relates generally to a device for providing a temporary coupling between a source of pressurized fluid, preferably compressed air, and a user member. A particular application for such a device is for use in temporary inflating a bladder in a plate cylinder of a rotary printing press.

BACKGROUND OF THE INVENTION

When a user member moves rotationally about a given axis with respect to a source of pressurized fluid, it is possible to fluidly connect these devices using rotating connectors, but this solution is particularly complex and expensive if a permanent fluidic coupling is not required. Its application is further limited to a very precise type of relative movement.

Use may also be made of flexible pipes equipped with so-called "quick" connectors, which are put in place manually when the fluidic coupling is necessary and which are then removed manually afterwards. Such a method for temporary fluidic coupling offers the advantage of being adaptable to any type of relative displacement and of coping with wide tolerances in the relative positioning of the end-fittings of the user member and of the source of pressurized fluid, but the manipulations which this imposes are time-consuming and require very specific attention since forgetting to undo a connector before the user member and the source of pressurized fluid begin to move relative to one another may lead to considerable damage.

SUMMARY OF THE INVENTION

An object of the present invention is to overcome these drawbacks.

The present invention therefore provides a device for temporary fluidic coupling comprising: a source of pressurized fluid; a supply end-fitting connected at least temporarily to the source of pressurized fluid; a supplied end-fitting; and a user member to be filled with pressurized fluid, the user member connected to the supplied end-fitting; the supplied end-fitting having a transverse first annular face facing the supply end-fitting and defining the mouth of a first internal pipe for fluidic coupling with the user member; the supply end-fitting having a body and a piston, the piston having a transverse second annular face defining a mouth of a second internal pipe for fluidic coupling with the source of pressurized fluid, the second annular face facing the first annular face; the piston sealedly and longitudinally slidably mounted inside the supply end-fitting body so that it can move between an active position where the second annular face is sealed against the first annular face for coupling the first and second internal pipes, and a rest position in which the piston is comparatively retracted inside the supply end-fitting so that the first and second annular faces are disjoined and the mouths of the first and second internal pipes are exposed to ambient pressure, the piston being forced into the active position when pressurized fluid is supplied from the source and the piston returning to the rest position when pressurized fluid is no longer supplied from the source.

The invention also provides a printing press having this device for inflating a bladder to operate a mechanism for attaching a printing plate.

In more detail, the present invention proposes a device for temporary fluidic coupling between a source of pressurized fluid, particularly compressed air, and a user member, particularly a single-acting pneumatic thrust cylinder, including a supply end-fitting and a supplied end-fitting placed at least temporarily face to face in a given longitudinal direction, and connected fluidically, at least temporarily, respectively to the source of pressurized fluid and to the user member, and means for temporary fluidic coupling between the end-fittings thus positioned.

It is more particularly, although not exclusively, concerned with the temporary fluidic coupling between a source of pressurized fluid and a user member which can essentially move with respect to one another, but which are also capable of being immobilized with respect to one another, in a given relative position within the limit of known tolerances, at least for the time necessary for supplying the user member with pressurized fluid coming from the source. Instead of being immobilized with respect to one another, it is also possible to fill the user member when the two parts are moving sufficiently slowly during this time to be able to be considered as almost fixed within the limit of known tolerances. By way of a non-limiting example of a machine in which a temporary fluidic coupling might thus be established between a source of pressurized fluid and a user member, mention may be made of rotary printing presses in which the cylinders may include thrust cylinders for controlling a gripper member, for example for gripping a printing plate if this is a plate cylinder, and which only require fluid to be supplied to these thrust cylinders, preferably pneumatic but possibly hydraulic, for example for releasing the printing plate and taking up another one, when the printing press is stopped.

The temporary fluidic coupling may include:

- on the supplied end-fitting, a transverse annular face then placed facing the supply end-fitting and defining the mouth of an internal pipe for fluidic coupling with the user member,
- on the supply end-fitting, a retractable seal formed by a longitudinal tubular piston, having, towards the transverse annular face of the supplied end-fitting, a transverse annular face and defining the mouth of an internal pipe for fluidic coupling with the source of pressurized fluid, which piston is mounted with longitudinal sliding, with mutual sealing, inside the supply end-fitting so that it can move between an active position for applying its transverse annular face in a sealed manner onto the transverse annular face of the supplied end-fitting and for fluidic coupling between the internal pipes, and a rest position in which the piston is comparatively retracted inside the supply end-fitting, the transverse annular faces are mutually disjointed and the mouths of the internal pipes are exposed to ambient pressure, the piston having useful transverse sections respectively inside the supply end-fitting, outside the supply end-fitting in the rest position, outside the supply end-fitting but respectively in fluidic communication with the internal pipes and so that it is exposed to ambient pressure in the active position, such that it passes from its rest position to its active position when it receives pressurized fluid from the source, remains in its active position for as long as it receives pressurized fluid from the source, and returns to its rest position when it no longer receives pressurized fluid from the source.

The great mechanical simplicity and the reduced possibilities of wear of such a device will be noted, and the operation of which device may furthermore be made entirely automatic because it is the opening of a fluidic coupling between the source of pressurized fluid and the pipe of the supply end-fitting which automatically establishes the coupling between the latter and the supplied end-fitting; the interruption of the supply to the pipe of the supply end-fitting from the source of pressurized fluid automatically interrupts the coupling between the respectively supply and supplied end-fittings, which prevents any risk of a failure which would cause an accident.

It is furthermore noted that such a type of temporary fluidic coupling may be adopted between components which make any type of movement whatsoever with respect to one another outside of the fluidic coupling periods and, within certain amplitude limits, during these periods, and in particular movements other than rotational movement. This constitutes an advantage over the rotating seals which can naturally only be adopted between components making a relative rotational movement.

Depending on the method of incorporating the device, and more precisely the method of connecting the pipe of the supplied end-fitting to the user member, the retractable seal may be returned to its rest position without an accessory arrangement, simply by the action of the pressures acting on it, as will appear later, or provision may be made for the retractable seal to include means for elastically returning the piston from its active position to its rest position.

To facilitate the establishment of a seal between the supplied end-fitting and the supply end-fitting, particularly when they remain movable with respect to one another, within certain limits, during the periods of fluidic coupling or if, when these periods are accompanied by a stop, their relative position when stopped is determined only with a certain degree of inaccuracy, provision is preferably made for at least one of the transverse annular faces to be planar and for the other transverse annular face to have a projecting annular seal surrounding the respective mouth and capable also of surrounding the other mouth in the active position.

The annular seal may thus be carried by the transverse annular face, which may be planar, of the piston to interact with a planar annular face of the supplied end-fitting. However, mounting the seal on the transverse annular face of the supplied end-fitting to interact with a planar annular face of the piston does not depart from the scope of the present invention.

This invention will be better understood if reference is made to the description hereinbelow of two non-limiting implementation examples, as well as to the appended drawings which form an integral part of this description.

BRIEF DESCRIPTION OF THE DRAWINGS

These drawings illustrate two applications of the device according to the invention to the temporary fluidic supply, with compressed air, of means constituting a single-acting pneumatic thrust cylinder provided inside a plate cylinder of a rotary printing press. The thrust cylinders are used during changes of printing plate, by pivoting of a tension bar which is also housed inside the plate cylinder, operating at least one hook mounted on this tension bar and interacting with a posterior edge of the plate fastened by an anterior edge onto the plate cylinder, either to immobilize the plate in tension, in a state wound around the external surface of the plate cylinder, which is cylindrical about the axis of rotation of this cylinder, in a rear limiting position which the hook occupies in the absence of supply of pressurized fluid to the thrust cylinder. To release the posterior edge of the plate to allow it to be dismantled and another plate to be installed, the hook is placed in a front limiting position which the hook occupies temporarily when the thrust cylinder is supplied with pressurized fluid; these notions of front and rear, of posterior edge and of anterior edge, being understood by reference to a given direction of rotation of the plate cylinder about its axis during printing, as likewise during the installation of a printing plate.

It is clearly understood, however, that is only one example of possible applications of a device for temporary fluidic coupling according to the invention, and that by envisioning adapting such a device to other contexts, if necessary in the form of a variant of the two embodiments which will be described with reference to the appended figures, one does not depart from the scope of this invention.

FIG. 16 shows a view of these means in longitudinal section, on the left-hand side, in the absence of supply of pressurized fluid, and on the right hand side, when they are supplied with pressurized fluid.

FIGS. 16A and 16B illustrate these same means, in section through transverse planes referenced respectively XVIA—XVIA and XVIB—XVIB in FIG. 16, respectively in the absence of a supply of pressurized fluid, and in the case of a supply of pressurized fluid.

DETAILED DESCRIPTION

Figure 1:
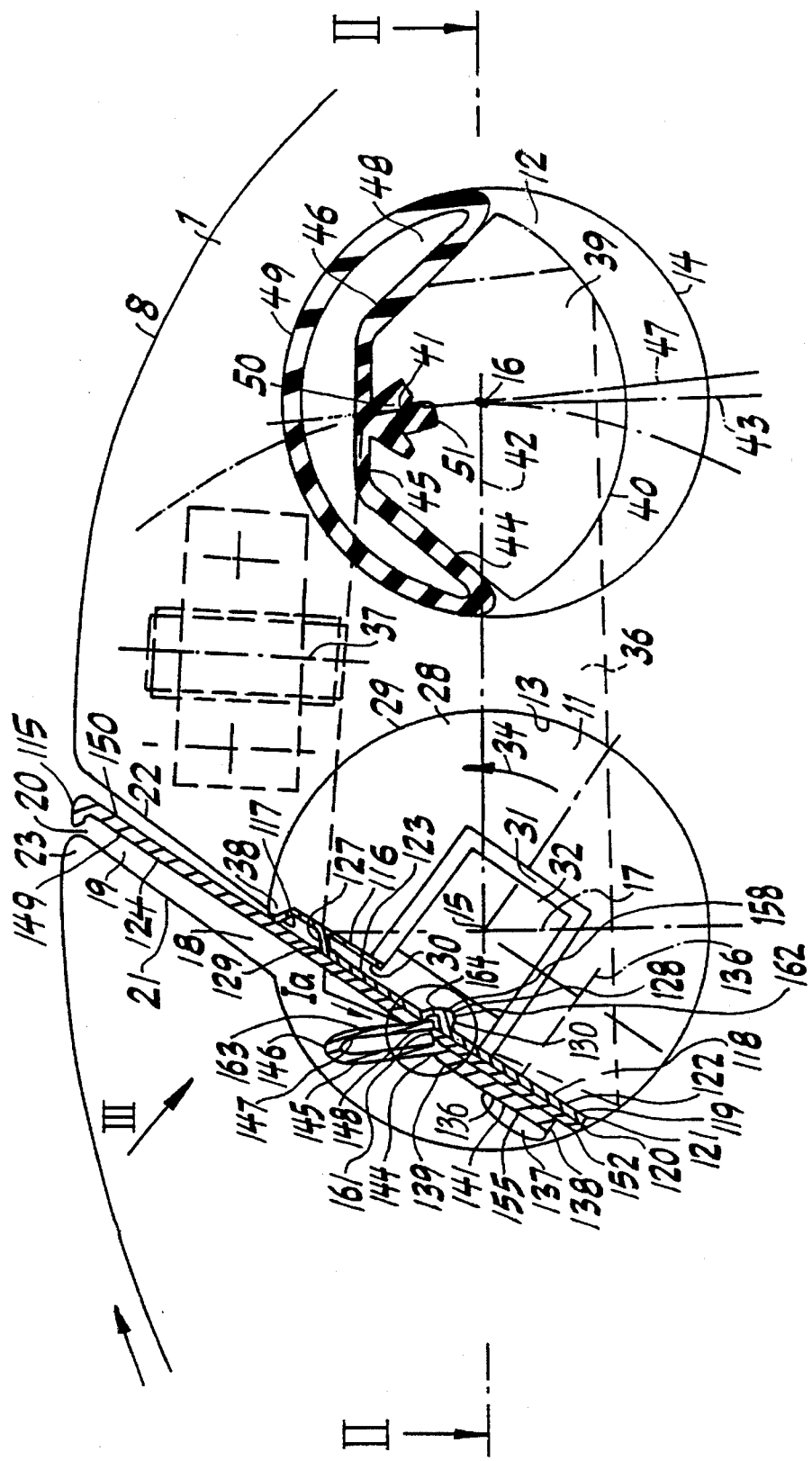
FIG. 1 shows a view, in transverse section along a plane referenced I—I in FIG. 2, of a device implementing the invention, for holding the posterior edge of a printing plate wound in the almost tensioned state on the external surface of a plate cylinder, the hook occupying its rear limiting position in the absence of a plate.

In these figures, 1 denotes a plate cylinder, mounted so that it can rotate about a horizontal longitudinal axis 2 on a frame 3 of a rotary printing press. The plate cylinder 1 is delimited particularly by two transverse faces 4, 5 of overall planar shape, each of which is equipped along the axis 2 of a longitudinal journal 6, 7 received in a rolling-contact bearing such as 188 of the frame 3 (See FIGS. 8a, 8b and 17b). Between the transverse faces 4, 5, the plate cylinder is delimited by a longitudinal external surface 8, which is essentially cylindrical about the axis 2. The surface 8 is intended to receive and to retain a printing plate 9 by coaxial winding and circumferential tensioning of the printing plate 9, according to methods which will be described later. Driving means, not represented, are provided to rotate the plate cylinder 1, and with it the printing plate 9, about the axis 2 with respect to the frame 3 in a given direction 10. This allows both for winding the printing plate 9 over the external surface 8 of the plate cylinder 1 before a printing run and for rotating the plate 9 during printing.

The direction 10 will serve as a reference, hereinafter, for the notions of front and rear, upstream and downstream, and anterior and posterior.

With reference to FIG. 1, in the immediate vicinity of the external surface 8 of the plate cylinder 1 are formed, in the latter, two longitudinal bores 11, 12 which are mutually juxtaposed in the direction 10. Both are delimited by internal cylindrical surfaces 13, 14 about longitudinal axes 15, 16, respectively. The two bores 11, 12 extend at least over most of the longitudinal dimension of the external plate cylinder surface 8. Their diameters, which are for example identical, are small compared to that of the external surface 8 so that their internal surfaces 13, 14 do not intersect the external surface 8. This is so despite the positioning of their axes 15, 16 closer to the external surface 8 than to the axis 2 of this external surface 8.

The internal surface 14 of the downstream bore 12 is continuous. The internal surface 13 of the upstream bore 11 has locally, between the axis 15 and the external surface 8 of the plate cylinder 1, along a longitudinal mean plane 17 which is common to the axes 2 and 15, a break over a few degrees of angle with reference to the axis 15. This break in the internal surface 13 of the bore 11 constitutes a mouth 18 of a flat slit 19. Flat slit 19 connects this internal surface 13 to the external surface 8 of the plate cylinder 1, in which this slit 19 has a mouth 20 which is offset towards the front with respect to its mouth 18, so that the slit 19 is inclined with respect to the mean plane 17 so as to move away from the latter in the sense of moving away with respect to the axis 2 or with respect to the axis 15. Between its mouths 18 and 20, the slit 19 is delimited by two mutually parallel plane sides, respecting this inclination with respect to the axis 17: an upstream or posterior side 21 and a downstream or anterior side 22. The two sides 21, 22 are spaced apart by a slight distance with respect to the diameter of the internal surface 13 of the bore 11, that is to say, in practice, of the order of a few millimeters.

Figure 12:
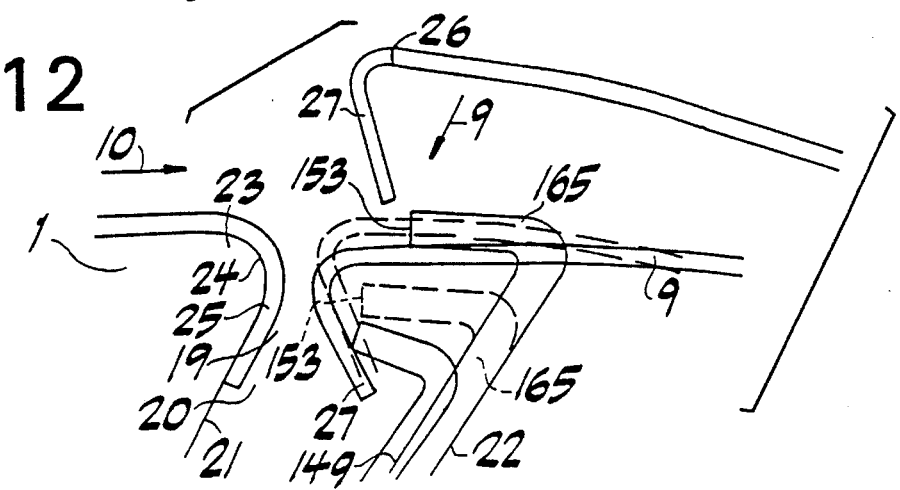
FIG. 12 shows, in a detailed view stemming from FIG. 11, successive steps in fastening the posterior edge of the plate onto the hook, as the hook passes from its front limiting position to its rear limiting position, in which it is retracted with respect to the external surface of the plate cylinder.

Taking into account its inclination with respect to the plane 17, the upstream side 21 of the slit 19 defines, with the external surface 8 of the plate cylinder 1, a spur 23 onto which, in a manner known per se, a longitudinal anterior end fold 24 of the printing plate 9 is fastened (See, e.g., FIG. 12). This fold is produced by forming, in the plate 9, a flat longitudinal anterior end rim 25 which forms a hook with the immediately adjacent regions of the printing plate 9 and rests flat on the upstream side 21 of the slit 19.

The printing plate 9 also has a longitudinal posterior end fold 26, defined by a longitudinal flat end rim 27 folded over into a hook with respect to the immediately adjacent regions of the printing plate 9 into a position such that this posterior end fold 26 coincides with the mouth 20 of the slit 19. The end rim 27 penetrates into the slit without contacting the sides 21 and 22 when the printing plate 9 is wound in the tensioned state over the external surface 9 of the plate cylinder, with a view toward immobilizing the plate with respect to the plate cylinder, using means which are partially housed in the slit 19 and in the bores 11 and 12 and which will be described presently.

It will be noted that, according to an arrangement which is known per se by one skilled in the art, and which is not illustrated, a plurality of these means could be distributed angularly around the axis 2 of the plate cylinder 1, as may the respectively corresponding arrangements of the plate cylinder, grouping together a bore 11, a bore 12, and a slit 19 which are arranged as described so that each slit similar to the slit 19 receives an anterior end fold, similar to the fold 24, of a printing plate, and a posterior end fold, similar to the fold 26, of another printing plate, these printing plates, which are similar to the plate 9, following on circumferentially from each other over the external surface 8 of the plate cylinder 1. The design of one of these distributed means would be identical to that which will be described presently.

Figure 2:
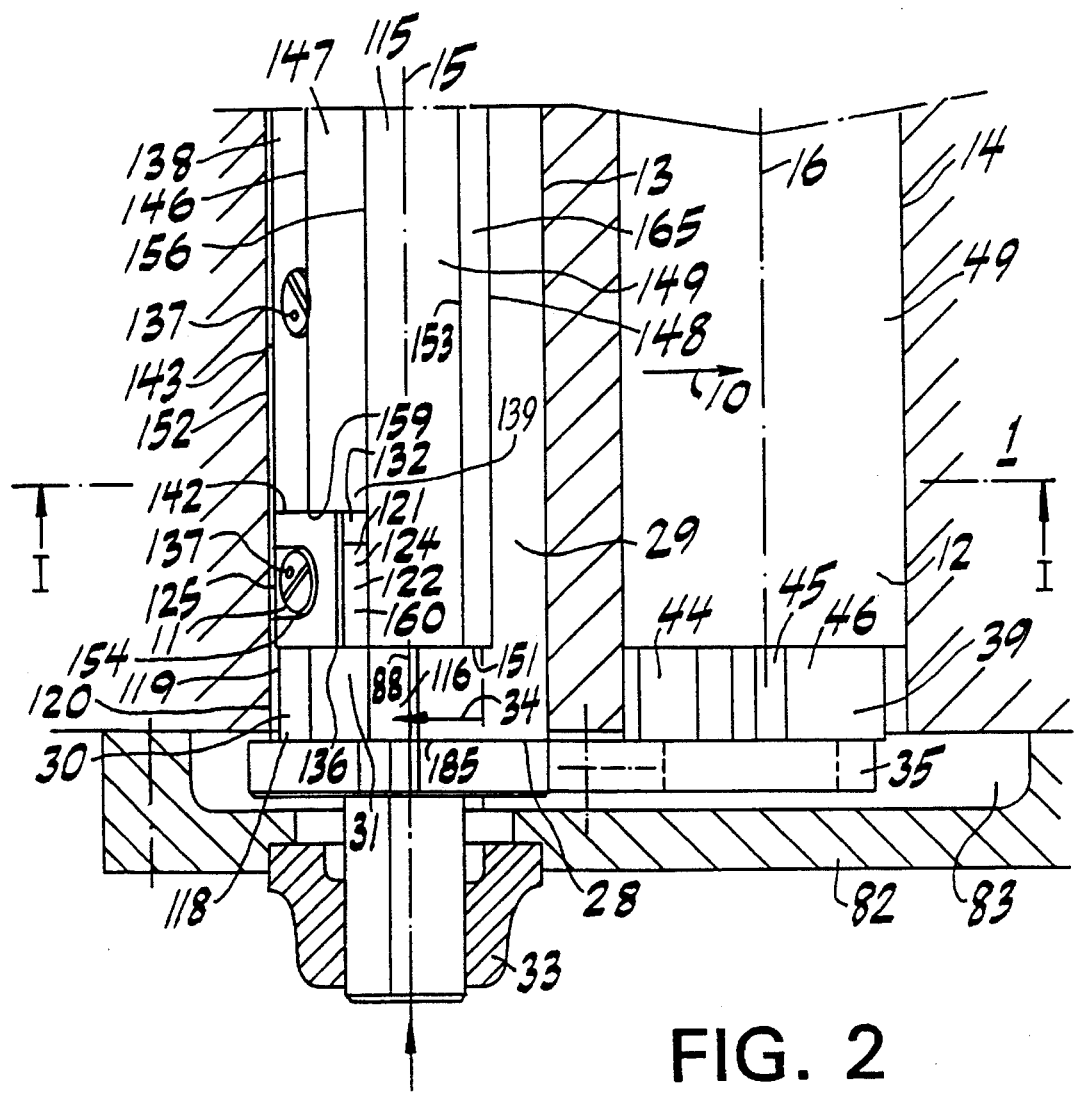
FIG. 2 shows a view of this same device in partial section along a longitudinal plane, including the axis of the tension bar, and referenced II—II in FIG. 1.
Figure 3A:
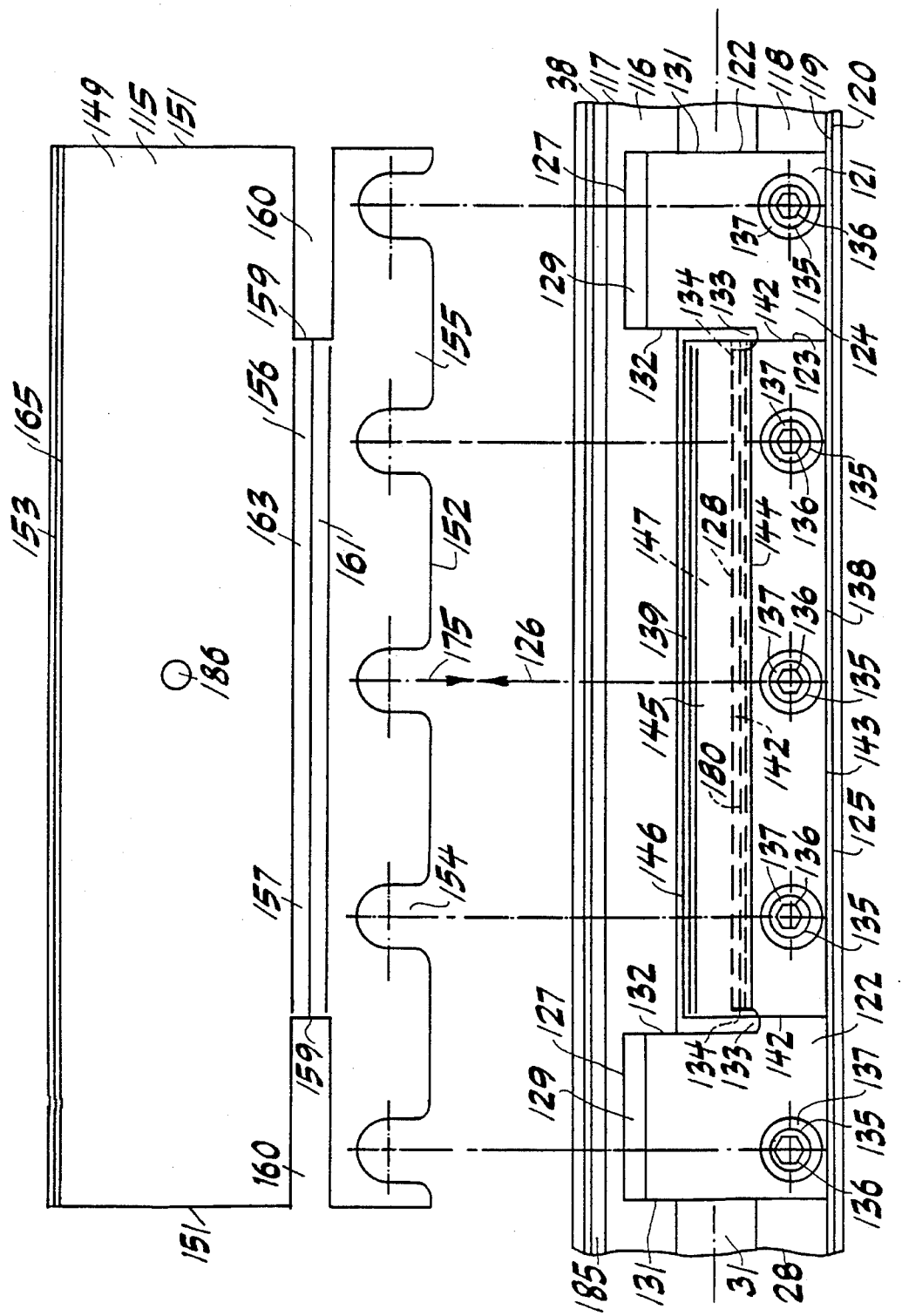
FIGS. 3A and 3B illustrate respectively in an elevation view in a transverse direction referenced III in FIG. 1, and in a view similar to that of FIG. 1, two successive operating phases for mounting an elastic leaf, constituting the hook, on the tension bar.

Reference will first be made to FIGS. 1, 2, 3A where it is shown that inside the bore 11 is mounted and guided, in rotation about the axis 15, a longitudinal tension bar 28. The tension bar is delimited, on an angular development of the order of 240° with reference to the axis 15, by an external surface 29 which is cylindrical about this axis and has a diameter substantially equal to that of the internal surface 13 of the bore 11, so that the faces 13 and 29 are in sliding contact for guiding the tension bar 28 in relative rotation about the axis 15. The tension bar 28 is further delimited, over approximately 120°, by a longitudinal flat 30 the shape of which will be detailed subsequently, and which essentially extends the slit 19 in all the positions that the tension bar occupies as it pivots about the axis 15 inside the bore 11 under normal conditions of use.

The tension bar 28 extends over the entire longitudinal dimension of the plate cylinder 1 and has, over its longitudinal dimension, a longitudinal internal housing 31 of axis 15 and of square transverse section, in which is coaxially received a longitudinal torsion bar 32, also of square transverse section, by means of bearings such as 33 mounted securely on the respectively corresponding transverse face of the plate cylinder. The torsion bar 32 is twisted at both ends at the level of the transverse faces 4 and 5 of the plate cylinder 1. The mounting of the torsion bar 32 is such that it elastically urges the tension bar 28 in rotation about the axis 15 with respect to the plate cylinder 1 in a direction 34 which, in the immediate vicinity of the mouth 18 of the slit 19, is opposite the direction 10. This is true for any orientation of the tension bar 28 about the axis 15 inside the bore 11 under normal conditions of use.

Figure 10:
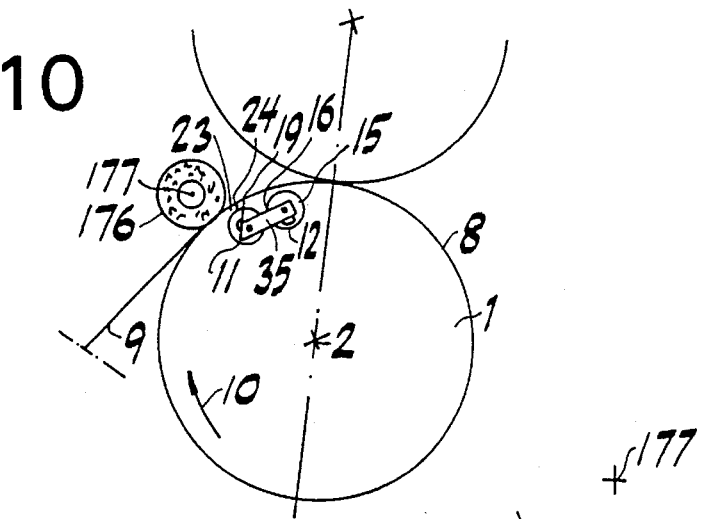
FIG. 10 shows, in an elevation view in a longitudinal direction referenced X in FIG. 2, the start of an operation of winding a printing plate over the external surface of the plate cylinder, on which the printing plate is already fastened by an anterior end fold.

Between each bearing such as 33 of the torsion bar 32 and the respectively corresponding transverse face 4, 5 of the plate cylinder 1, the tension bar 28 also has a respective end via which it carries, securely, a respective lever 35, 36. (See FIGS. 1 and 10).

Figure 14:
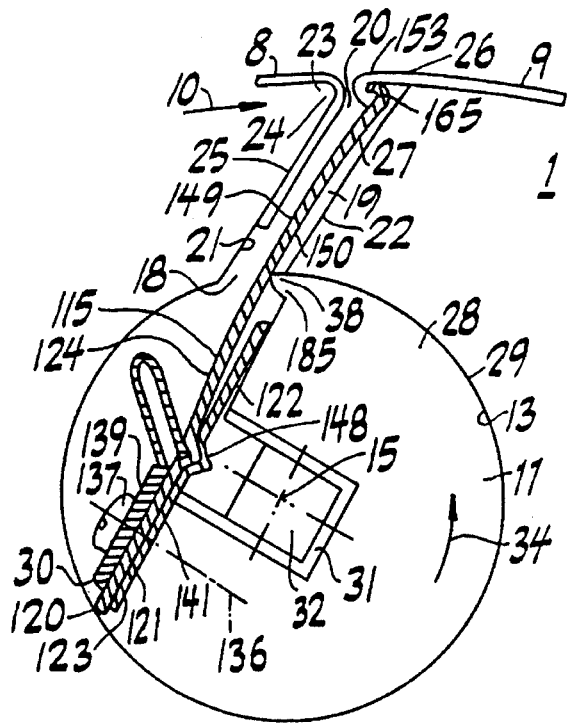
FIG. 14 shows, in a view similar to those of FIGS. 1, 3, 5 to 7, 11, 13, the tensioning of the plate by bending the leaf defining the hook, tending to reach its rear limiting position but retained due to the fact that it is fastened in the posterior fold of the printing plate.
Figure 15:
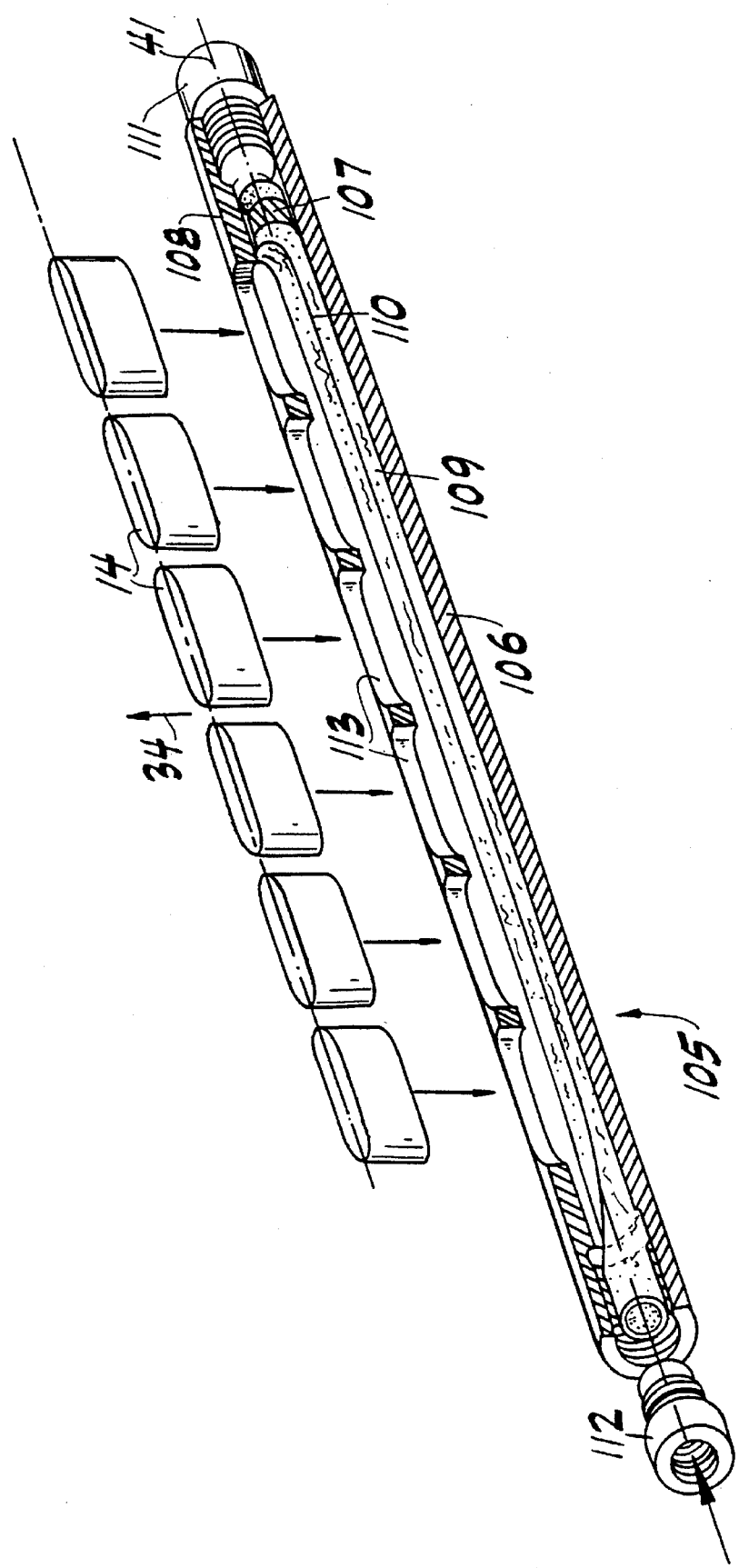
FIG. 15 illustrates, in a perspective view, single-acting pneumatic driving means which may be substituted for those which have been illustrated in FIGS. 1, 2, 9, 9A, 9B, 11, 13 for temporarily placing the tension bar in its orientation which corresponds to the front limiting position of the hook, by temporarily supplying pressurized fluid, preferably compressed air.

The two levers 35, 36 are radial with reference to the axis 15, mutually parallel and oriented approximately perpendicularly to the plane 17 in any orientation of the tension bar 28 under normal conditions of use, so that they have a respective end in the longitudinal extension of the bore 12, one end facing the transverse face 4 of the plate cylinder 1 and the other end facing the transverse face 5 of the plate cylinder. Adjustable stops such as 37, mounted on the transverse faces 4, 5 of the plate cylinder 1 immediately downstream of the slit 19, interact with the arms 35 and 36 in order to oppose the pivoting movement of the tension bar 28 about the axis 15 inside the bore 11, in the direction 34. The stop sets a limit corresponding to one positioning of a rectilinear longitudinal edge 38 forming the limit of the external surface 29 in the direction 34 facing the mouth 18 of the slit 19 in the bore 11. In other words, a region of the external surface 29 immediately next to this edge 38 is placed facing the slit 19, i.e. between the respective connections of the upstream side 21 and downstream side 22 of this slit 19 with the internal surface 13 of the bore 11, as shown in FIG. 1; this position is also shown in FIG. 14.

From this limiting orientation, the tension bar 28 may pivot about the axis 15 in a direction opposite the direction 34 inside the bore 11, which detaches the arms 35, 36 from the stops such as 37, towards the axis 2 of the plate cylinder 1, thereby leading to an increase in the stresses in the torsion bar 32.

A limit to this pivoting of the tension bar 28 inside the bore 13 in the direction opposite the direction 34 is imposed by a profiled longitudinal bar 39 housed inside the bore 12 and passing longitudinally through the plate cylinder 1, from one to the other of the transverse faces 4, 5 of the plate cylinder at the level of which the faces of this profiled bar 39 are secured to the levers 35 and 36 respectively.

Figure 11:
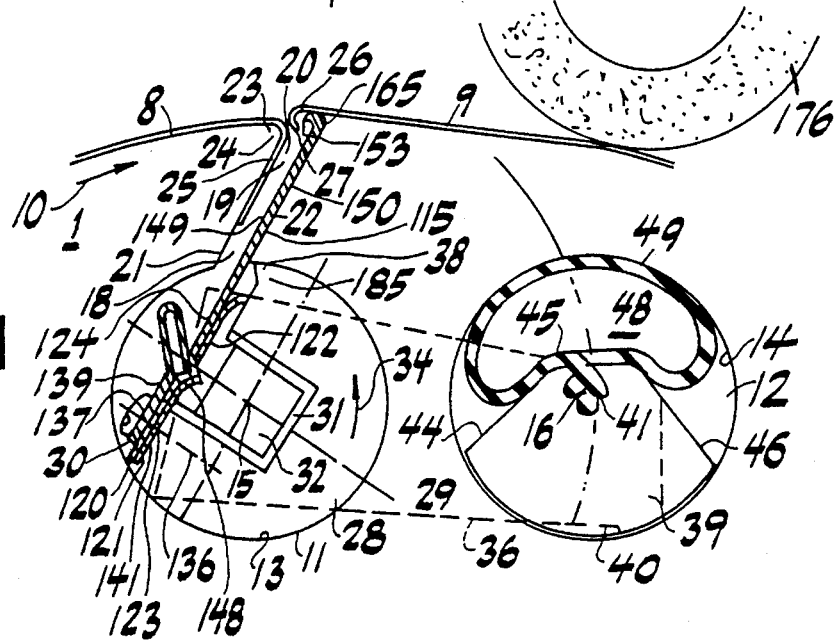
FIG. 11 shows, in a view similar to that of FIGS. 1, 3, 5 to 7, a phase immediately prior to the fastening of the posterior edge of the plate onto the hook, which then occupies its front limiting position, in which it forms a slight projection, for example of the order of one to several millimeters, with respect to the external surface of the plate cylinder.

If reference is also made to FIG. 11, which illustrates the bar 39 in abutment, in the direction opposite the direction 34, against the internal surface 14 of the bore 12. It is seen that this bar 39 is delimited in the direction opposite the direction 34 by an external surface 40 which is cylindrical about a longitudinal axis 41 which, in the position illustrated in FIG. 1, is located on the same side as the slit 19 of a longitudinal plane 42 perpendicular to the plane 17, defined by the axes 14 and 16 whereas this axis 41 coincides with the axis 16 in the limiting position illustrated in FIG. 11. With reference to this axis 41, the external surface 40 has a diameter identical to that of the internal surface 14 of the bore 12 with reference to the axis 16, with an angular development on the order of 100°, evenly distributed on either side of a longitudinal plane of symmetry 47 of the profiled bar 39. This plane of symmetry passes through the axis 41 and is coincident with a longitudinal plane 43 parallel to the plane 17 and passing through the axis 16 in the position of the profiled bar 39 which is illustrated in FIG. 11.

Thus, the profiled bar 39 may move, by rotating about the axis 15 inside the bore 12, so that it is guided by the tension bar 28, between the position illustrated in FIG. 1, defined by the arms 35 and 36 abutting against the adjustable stops such as 37 in the direction 34, and the position illustrated in FIG. 11 in which the axis 41 is coincident with the axis 16 and the external surface 40 bears in the direction opposite the direction 34 on the internal surface 14 of the bore 12, locally matching this internal surface 14. This position of the profiled bar 39 corresponds for the tension bar 28 to another limiting orientation, with reference to the axis 15, inside the bore 11; the two limiting orientations thus defined for the tension bar 28 are only mutually angularly offset by a few degrees, for example about ten degrees, with reference to the axis 15.

In the direction 34, the profiled bar 39 is delimited by three plane longitudinal external surfaces 44, 45, 46; the face 45, which is symmetrical with respect to the plane 47, mutually connects the faces 44 and 46, which are mutually symmetrical with respect to the plane 47 and are connected moreover to the external surface 40. The faces 44, 45, 46 are dimensioned in a way which can easily be determined by one skilled in the art, so that, in the position illustrated in FIG. 1, there remains between them and the internal surface 14 of the bore 12 in the direction 34 a clearance 48 of constant transverse section, extending over all the longitudinal dimension of the plate cylinder 1 between its transverse faces 4 and 5.

This clearance 48 is occupied by an inflatable bladder 49 extending practically over all of the longitudinal dimension of the plate cylinder 1 between the transverse faces 4 and 5 of the latter and anchored onto the profiled bar 39 for example by engagement of a longitudinal rib 50, that the bladder 49 exhibits externally, securely into a longitudinal groove 51 formed in the face 45 of the profiled bar 39 along the plane of symmetry 47, which also constitutes a plane of symmetry for the clearance 48 and the bladder 49. The rib 50 is anchored in the groove 51 by suitable shaping of their transverse section, comparable to a dovetail cross-section, it being clearly understood that other means may be chosen for securing the bladder 49 to the profiled bar 39, particularly bonding.

The bladder 49 constitutes a single-acting driving means making it possible to bring the tension bar 28 from its orientation illustrated in FIG. 1 to its orientation illustrated in FIG. 11, by inflation by means of a fluid which is at a higher pressure with respect to the ambient pressure, namely compressed air. This leads to an increase in the elastic urging of the torsion bar 32, which tends to return the tension bar 28 to its orientation illustrated in FIG. 1, causing deflation of the bladder 49 when the bladder is not supplied with pressurized fluid.

Figure 8A:
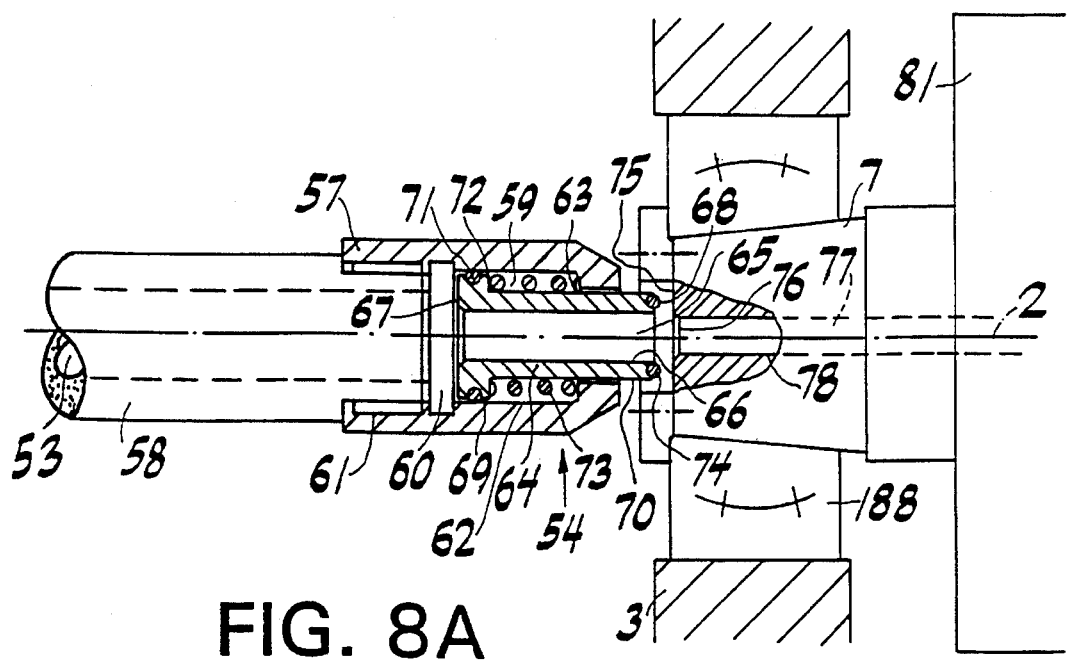
FIGS. 8A and 8B illustrate, in sectional views through the longitudinal axis of the plate cylinder, two states of a device intended, in place of a rotating seal, to temporarily provide pressurized fluid, preferably compressed air, to a single-acting pneumatic means for driving the tension bar in order to place the latter temporarily in its orientation which corresponds to the front limiting position of the hook.
Figure 8B:
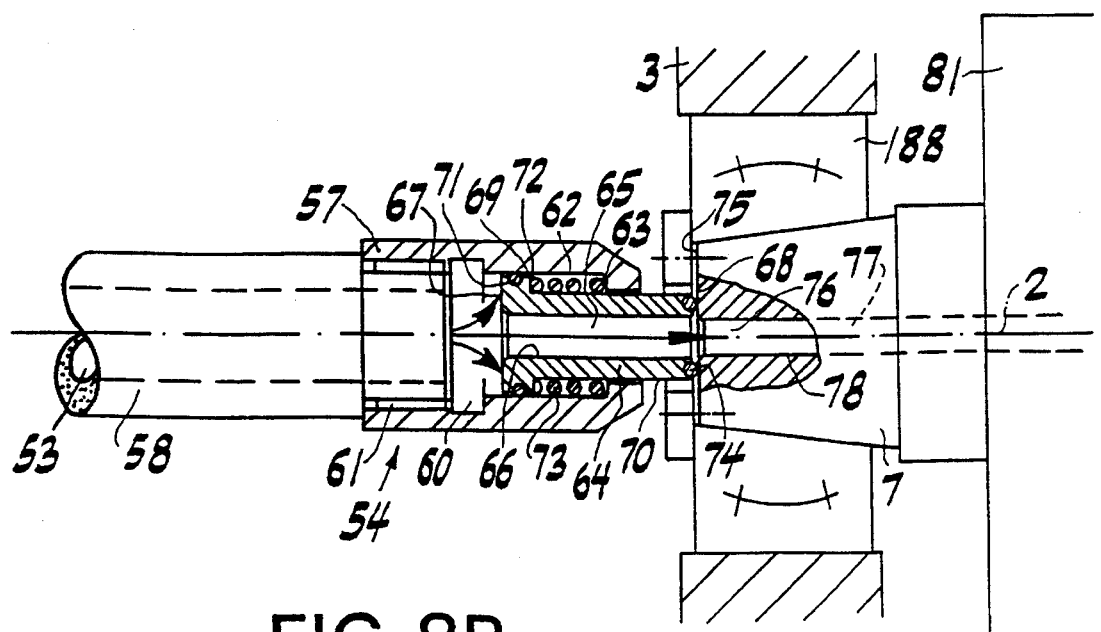
Figure 9:
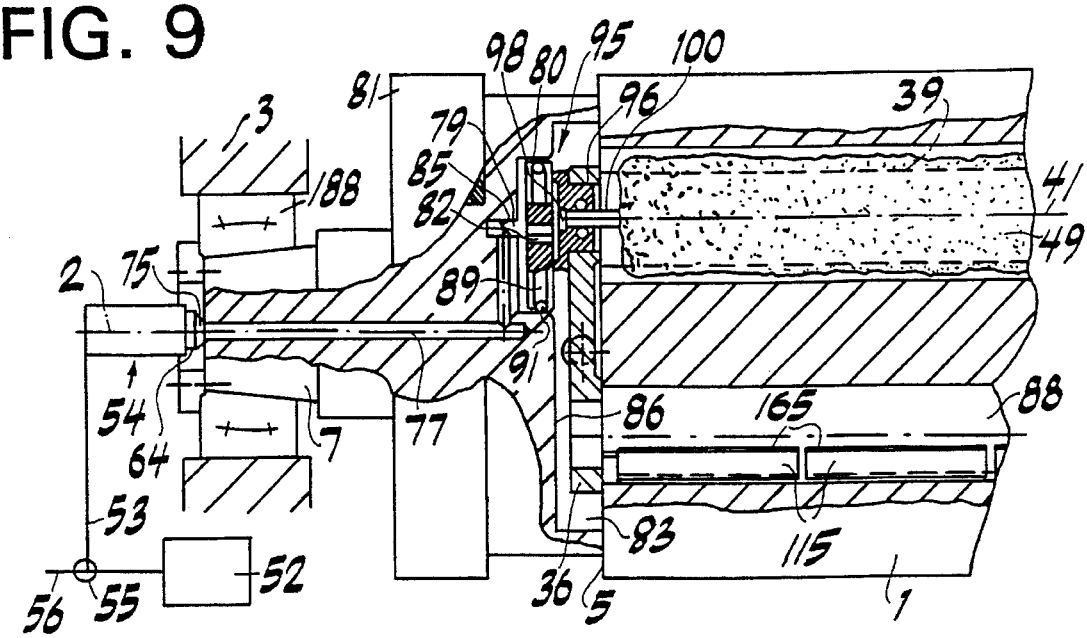
FIG. 9 illustrates, in a free sectional view through the plate cylinder, the pneumatic circuit provided for this purpose inside this cylinder.

To supply the bladder 49 temporarily with pressurized fluid, preferably compressed air, and to reestablish atmospheric pressure inside the bladder 49 for the rest of the time, means are provided which will be described presently, with reference to FIGS. 8A, 8B, 9, 9A, 9B, among which FIG. 9 shows an overall view of the pneumatic circuit.

52 denotes a source of pressurized fluid held by the frame 3 of the machine, namely in this example an air compressor equipped with a compressed air reservoir, in a known manner. The source 52 is capable of supplying compressed air to a pipe 53 which leads to a supply end-fitting 54 also carried by the frame 3 of the machine and arranged longitudinally, coaxially, facing the journal 7 of the plate cylinder 1. A valve 55 is interposed in the pipe 53 making it possible alternately, and in a controlled manner, to connect this pipe 53 either to the source of pressurized fluid 52, or to a vent 56 opening out to free air in the case where the pressurized fluid is compressed air, as is illustrated.

The embodiment of the supply end-fitting 54 and its interaction with the journal 7 emerge more particularly from FIGS. 8A and 8B which show that instead of opening out level with the journal 7 onto a rotating seal, providing a permanent fluidic coupling as is conventionally the case when supplying a device which is rotating about a fixed axis from a source which is itself fixed, the supply end-fitting 54 is telescopic and establishes a sealed fluidic coupling with the journal 7 only when it is necessary to supply pressurized fluid, preferably compressed air, to the bladder 49 contained in the bore 12.

For this purpose, as is shown more particularly in FIGS. 8A and 8B, the supply end-fitting 54 is designed as a single-acting thrust cylinder.

It includes a tubular body 57 arranged along the axis 2, facing the journal 7 of the plate cylinder 1, and secured to the frame 3 of the machine for example by coaxial screwing on one end of a tube 58 delimiting the pipe 53 in the immediate vicinity of the end-fitting 54.

Of unimportant external shape, the tubular body 57 has an internal surface 59 which is cylindrical about the axis 2. The tubular body 57 connects longitudinally at one end towards the tube 58 and, through the use of a coaxial counterbore 60, to a coaxial tapping 61 for screwing onto the tube 58. At the other end, longitudinally opposite the tube 58, the tubular body 57 connects towards the journal 7 via a flat shoulder 63 which is annular about the axis 2 and points towards the tube 58, to another internal surface 62 also cylindrical about the axis 2 but with a diameter less than that of the internal surface 59 and opening out to ambient air.

On the inside of the body 57 is arranged a tubular piston 64 traversed right through on the axis 2 by a pipe 65 placed in permanent fluidic coupling with the pipe 53 and, for example, delimited by an internal surface 66 which is cylindrical about the axis 2 with a diameter less than that of the internal surface 62.

Respectively towards the tube 58 and longitudinally opposite the latter, the internal surface 66 opens out into plane frontal faces 67, 68 which are annular about the axis 2, the two frontal faces 67 and 68 being mutually spaced apart longitudinally by a distance which is more than the combined longitudinal dimension of the internal surfaces 59 and 62 of the body 57 and capable of allowing the operation which will be described later.

Each of these frontal faces 67, 68 connects the internal surface 66 to a respective external surface 69, 70 cylindrical about the axis 2. The external surface 69, which thus delimits the piston 64, in the direction of moving away from the axis 2, in its region closest to the tube 58, has a diameter which is slightly less than that of the internal surface 59 of the body 57 to which it is coupled in a sealed manner by a seal 71 which is annular about the axis 2. The external surface 70 has a diameter which is slightly less than that of the internal surface 63 but close to this diameter, so that a mutual sliding guide relationship is established, along the axis 2, on the one hand between the faces 69 and 59 with mutual sealing through the use of the seal 71 and, on the other hand, between the faces 70 and 63, without mutual sealing.

The external surfaces 69 and 70 are connected mutually, inside the body 57, by a plane shoulder 72, annular about the axis 2, and thus placed longitudinally facing the shoulder 62 of the body 57, from which it is permanently spaced longitudinally, under normal operating conditions, on the one hand, due to the fact that the external surface 69 has a longitudinal dimension which is considerably less than that of the internal surface 59 and, on the other hand, due to the presence of a helical spring 73 of axis 2, wound around the external surface 70 between the external surface 70 and the internal surface 59, and acting in longitudinal compression between the shoulders 72 and 62.

When spring 73 is not longitudinally compressed, as illustrated in FIG. 8A, the frontal face 67 of the piston 64 is flush with the counterbore 60. In a position of maximum elastic compression of the spring 73 illustrated in FIG. 8B, the frontal face 67 is longitudinally offset in the direction of moving away with respect to the tube 58 and to the counterbore 60. These two positions correspond respectively to a rest position with longitudinal retraction of the piston 64 into the body 57, and to an active position in which the piston 64 projects longitudinally out of the body 57, towards the journal 7 with which there is then established a sealed contact, through the use of an annular seal 74 held securely by the frontal face 68.

One skilled in the art will easily understand that when the pipe 53 is at atmospheric pressure, the piston 64, which is exposed to atmospheric pressure on the one hand on its frontal face 67 and on the other hand on its frontal face 68 and on the shoulder 72 but which is urged by the spring 73, occupies its retracted position. By virtue of a suitable preload on the spring 73, it reaches its projecting position when the pipe 53 is supplied with compressed air coming from the source 52 acting on the frontal face 67 while atmospheric pressure continues to act on the face 68 and the shoulder 72. The piston then maintains this position while the pressure of the compressed air coming from the source 52 acts, replacing the atmospheric pressure, on the part of the frontal face 68 encircled by the seal 74, now in fluidic coupling with the inside of the pipe 53 while atmospheric pressure continues to be applied to the rest of the frontal face 68 and to the shoulder 72, and returns to its retracted position when atmospheric pressure is reestablished in the pipe 53.

Longitudinally facing the end-fitting 54, and more precisely the frontal face 68 of the latter, equipped with the seal 74, the journal 7—which also constitutes a supplied-end fitting for the coupling—has a plane transverse frontal face 75 annular about the axis 2 and connecting towards the axis 2 to the mouth 76 of a pipe 77 formed along the axis 2 in the journal 7 and, for example, delimited inside this journal by an internal surface 78 cylindrical about the axis 2 with a diameter slightly less than that of the internal surface 66 of the piston 64, itself of a diameter such that its transverse section is slightly less than the current transverse section of the pipe 53.

The pipes 53 and 77 are thus placed in fluidic relation, so as to supply the pipe 77 with compressed air coming from the source 52 when the piston 64 occupies its projecting position illustrated in FIG. 8B, the seal 74 then being applied in a sealed manner against the frontal face 75 of the journal 7 around the mouth 76 of the pipe 77. As will be shown later, this sealing relation is established, in a way which is controlled particularly by suitable positioning of the valve 55 when the plate cylinder 1 is stopped or during a short phase in the rotation of the latter in the direction 10 about the axis 2 at a reduced speed, while a printing plate 9 is being installed on the external surface 8 of the plate cylinder 1; the rotation of the latter then being accompanied by a sliding of the seal 74 on the frontal face 75 of the journal 7, while maintaining the sealing relation between them. The piston 64 in contrast occupies its retracted position, illustrated in FIG. 8A, in a manner which is controlled particularly by suitable positioning of the valve 55, during the rotation of the plate cylinder 1 for the purpose of making prints; the pipe 77 is then directly open to free air, between the seal 74 and the frontal face 75.

As shown in FIG. 9, the longitudinal pipe 77 is extended right into the plate cylinder 1, and connects therein in a sealed manner to a pipe 79 which is essentially radial with reference to the axis 2, with a cross-section corresponding to the transverse section of the pipe 77 or slightly smaller than this transverse section.

This pipe 79 itself opens out longitudinally, via a right-angle elbow, into a cavity 80 of a transverse end flange 81, with an overall shape circular about the axis 2. The flange 81 is attached securely to the transverse face 5 of the plate cylinder 1, between this transverse face 5 and the rolling-contact bearing 188 for coupling to the frame 3, about the journal 7, and itself carries, in a secure but adjustable manner, one of the bearings of the torsion bar 32. Incidentally, the journal 6 is also surrounded by a transverse end flange 82 with an overall shape which is annular about the axis 2, attached securely to the other transverse face 4 of the plate cylinder 1 and, for its part, carrying, securely but adjustably, the other bearing 33 of the torsion bar 32. Each of the end flanges 81, 82 defines, with the respectively corresponding transverse faces 5, 4 of the plate cylinder 1, a housing 83, 84 for the respective one of the levers 36, 35 for coupling between the tension bar 28 and the profiled bar 39, longitudinally facing the bores 11, 12.

Figure 9A:
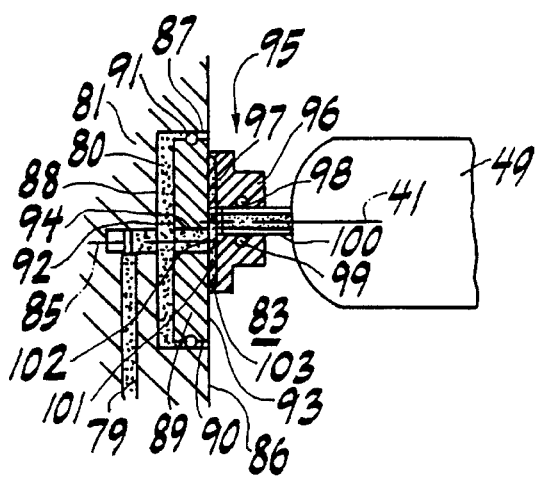
FIGS. 9A and 9B illustrate, in a detailed view stemming from FIG. 9, two states of a device intended, in this circuit, also temporarily to provide the supply of pressurized fluid to the pneumatic driving means, as well as to ensure the exhaust of the fluid from these pneumatic means, which are intended to be single-acting means.
Figure 9B:
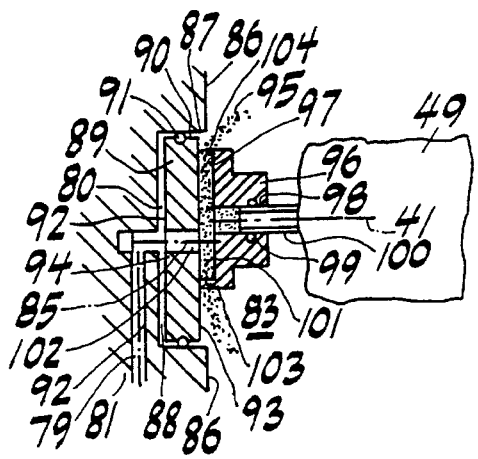

As also shown in FIGS. 9A and 9B, the cavity 80 is arranged along a longitudinal axis 85 which is at least approximately coincident with the axis 16 of the bore 12. It opens out towards the transverse face 5 of the plate cylinder 1 in a transverse face 86 of the housing 83, which face is located longitudinally opposite the transverse face 5 with respect to the lever 36. In the direction of moving away with respect to the axis 85 this face is delimited by an internal surface 87 cylindrical about the axis 85 with a diameter which is considerably greater than that of the bore 12, which surface 87 connects to the face 86 of a plane end transverse face 88 into which the elbowed pipe 79 opens at least approximately along the axis 85.

The cavity 80 thus constitutes a longitudinal cylinder, inside which a transverse piston 89 may move longitudinally to constitute a telescopic supply end-fitting 95 having great similarities with the supply end-fitting 54 to which it is connected in series, through the use of the pipes 77 and 79, to convey compressed air towards the bladder 49 when the piston 64 occupies its projecting position illustrated in FIG. 8B.

For this purpose, the piston 89 is delimited, in the direction of moving away with respect to the axis 85, by an external surface 90 cylindrical about the axis 85 with a diameter less than that of the internal surface 87 but sufficiently close to this diameter to establish a mutual guiding contact with relative longitudinal sliding through the use of a seal 91 which is annular about the axis 85 and attached securely to the external surface 90. The piston 89 is moreover delimited, respectively towards the end face 88 of the cavity 80 and longitudinally opposite this end, by two plane transverse faces 92, 93 mutually spaced by a longitudinal distance which is less than the longitudinal dimension of the internal surface 87 of the cavity 80.

Each of these transverse faces 92 and 93 connects the external surface 90 of the piston 89 to an internal surface 94, which is cylindrical about the axis 85 with a diameter equal or practically equal to the diameter of the internal surface 78 of the pipe 77 to define a pipe 102 passing right through the piston 89 along the axis 85 and placed in a sealing relation with the pipes 77 and 79.

One skilled in the art will understand that introducing compressed air coming from the source 52 into the cavity 80 tends to drive the piston 89 longitudinally towards an active position out of this cavity 80, its face 93 initially being exposed to atmospheric pressure. When the opening of the cavity 80 is then exposed to atmospheric pressure, through the use of the pipes 77 and 79 particularly when the supply end-fitting 54 is in the state illustrated in FIG. 8A, the piston 89 is released particularly as regards a longitudinal retracting movement to a rest position inside the cavity 80 when its face 93 is urged by a pressure which is greater than atmospheric pressure, first centrally, then completely, under conditions which will be described later.

To interact temporarily with the telescopic supply end-fitting 95 thus constituted by the cavity 80 of the end flange 81 and the piston 89, the bladder 49 is equipped with a supplied end-fitting 96 consisting of a component attached securely along the axis 41 to the lever 36 which moreover securely carries the profiled bar 39 and, by means of the latter, the bladder 49.

Longitudinally facing the transverse face 93 of the piston 89, this supplied end-fitting 96 has a plane transverse face 97 which is annular about the axis 41 and connects towards the latter to an internal surface 98 which is cylindrical about this axis and passes right through the supplied end-fitting 96 to receive, securely, with mutual sealing produced for example by means of an annular seal 99 about the axis 41, a tube 100 for inflating and deflating the bladder 49, offering a passage cross section which is substantially equal to that of the pipe 102. Any suitable passage is produced inside the profiled bar 39 to receive this tube 100 locally, in a manner which is not represented but can easily be envisaged by one skilled in the art.

In the direction of moving away with respect to the axis 41, the transverse face 97 of the supplied end fitting 96 connects to a rim 101 projecting longitudinally from this face 97, with a shape which is annular about the axis 41 and a diameter such that, regardless of the position that the profiled bar 39 occupies inside the bore 12 under the normal operating conditions, the internal pipe 102 of the piston 89 opens out to inside this rim 101. The appropriate dimensioning of the rim 101 for this purpose is within the normal capabilities of one skilled in the art.

Towards the face 93, the rim 101 is delimited by a plane edge 103 against which the face 93 of the piston 89 is pressed flat, in a sealed manner, when compressed air coming from the source 52 tends to drive the piston 89 out of the cavity 80. The rim 101 then constitutes both a seal and a stop preventing the piston 89 from being expelled from the cavity 80 enough to lose its sealed relation with this cavity through the use of the seal 91. This establishes a continuity in the transmission of compressed air from the source 52, through the use of the supply end-fitting 54 then occupying its state illustrated in FIG. 8B and of the supply end-fitting 95 occupying its state represented in FIG. 9A, the consequence being the inflation of the bladder 49. The piston 89 is then subjected to the pressure of the compressed air coming from the source 52 via its face 92, totally, and via the part of its face 93 located inside the rim 101, outside which the face 93 remains subjected to atmospheric pressure, so that this position of the piston 89 is maintained during inflation. This inflation is of course accompanied by a displacement of the profiled bar 39 inside the bore 12, but, by sliding over the face 93 of the piston 89 via its edge 103, the rim 101 maintains the mutual sealing, and the fluidic coupling between the internal pipe 102 of the piston 89 and the tube 100 of the bladder 49 is maintained, taking into account the aforementioned dimensioning of the rim 101.

When the connection of the pipe 53 to the source 52 ceases, and when the pipe 53 is consequently connected to the vent 56, the supply end-fitting 64 reaches its position illustrated in FIG. 8A under the effect of the spring 73, so that the cavity 80 is itself connected to free air, that is to say that the face 92 of the piston 89 is exposed to atmospheric pressure. In contrast, its face 93, also exposed to atmospheric pressure as regards its region surrounding the rim 101, is exposed to a higher pressure with respect to atmospheric pressure inside the rim 101, because of the increased pressure established inside the bladder 49 during the preceding inflation phase. This increased pressure drives the piston 89 towards the inside of the cavity 80 so that a clearance 104 is established between the edge 103 of the rim 101 and the face 93, which clearance allows the compressed air contained in the bladder 49 to be exhausted towards the inside of the housing 83 which has vent passages, not illustrated, which connect to atmospheric air. The bladder 49 is thus deflated, this being all the more so since the torsion bar 32, acting in the direction 34 on the tension bar 28, tends, through the use of the levers 35 and 36, to displace the profiled bar 39 in the direction of crushing the bladder 49 inside the bore 12.

The telescopic supply end-fittings 54 and 95 thus lend themselves particularly well to a temporary supply of the bladder 49 with compressed air, and could moreover have other applications, if necessary with fluids other than compressed air, it being understood that the nature of these fluids could imply an exhaust not to free air but to a low-pressure reservoir from which the source of pressurized fluid 52 would be supplied.

The temporary inflation of the bladder 49 has the object, within the scope of the device described, of allowing the fastening or unfastening of the posterior end fold 26 of a printing plate 9. The plate moreover is fastened, via its anterior end fold 24, onto the spur 23, whereas the deflation of the bladder 49 keeps this printing plate 9 wound, in the tensioned state, on the external surface 8 of the plate cylinder 1, particularly during printing.

Other means could however be used for this purpose, one embodiment of which has been illustrated in FIGS. 15, 16, 16A, 16B.

These figures illustrate a key-type thrust cylinder 105 intended to replace the assembly constituted by the profiled bar 39 and the bladder 49.

For this purpose, this key-type thrust cylinder 105 includes a rigid body 106 intended to be housed in the bore 12, in a longitudinal orientation, and to be secured to the levers 35 and 36 to connect the latter rigidly to each other, using means which are not represented but which can be easily envisaged by one skilled in the art.

The body 106 is tubular, and has an internal surface 107 and an external surface 108 which are cylindrical about the axis 41, if reference is made to its mounting position on the levers 35 and 36. Its external surface 108 has a diameter less than that of the internal surface 14 of the bore 12, so as to retain the possibility of moving inside this bore. This possibility was described with regard to the profiled bar 39 and corresponds to a rotation, about the axis 15, of the assembly formed by the tension bar 28, the profiled bar 39 and the two levers 35 and 36 which connect them together.

Via its internal surface 107, the body 106 delimits a longitudinal cavity 109 which encloses an inflatable bladder 110 which is in all respects comparable to the bladder 49. This bladder 110 is blocked off at one transverse end, located in the immediate vicinity of the lever 35, not illustrated in these figures, by a plug 111 screwed into the tubular body 106 whereas at its other end it is connected in a sealed manner to a component 112 which is screwed into the other end of the tubular body 106, level with the lever 36, and receives, securely, the supplied end-fitting 96, possibly modified for this purpose, in its parts pointing towards the bore 12, in a manner which can easily be envisaged by one skilled in the art.

Along a mean plane orientated as has been said of the mean plane 47, and for which this reference 47 has been retained, the body 106 is pierced, on one and the same side, pointing in the direction 34 with reference to the axis 15, with several mutually identical longitudinal openings 113 evenly distributed longitudinally. By way of non-limiting example six of these openings 113 have been illustrated, it being understood that a different number could be adopted.

In each of these openings 113 is mounted, so that it can slide radially with reference to the axis 41, a respective key 114 which, inside the tubular body 106, bears on the inflatable bladder 110.

When the bladder 110 is inflated, under conditions identical to those of the inflation of the bladder 49, the keys 114 tend to be driven towards the outside of the body 106, as shown in FIG. 16B, which drives the body 106 inside the bore 12 and causes a rotation of the tension bar 28 in the direction opposite the direction 34, with an increase in the stress in the torsion bar 32, this being until the body 106 comes into abutment in the direction opposite the direction 34 inside the bore 12. When, under conditions similar to those which were described with reference to the bladder 49, the bladder 110 is allowed to deflate, as shown in FIG. 16A, the torsion bar 32, by causing the tension bar 28 to rotate in the direction 34 inside the bore 11, causes the keys 114, bearing against the internal surface 14 of the bore 12, to retract towards the inside of the body 106 until the levers 35 and 36 come to bear against the adjustable stops such as 37.

Naturally, any other system of thrust cylinder, particularly, but not exclusively, a single-acting pneumatic thrust cylinder carried by the plate cylinder 1, could be adopted with a temporary supply of pressurized fluid 80, preferably compressed air, using the means which have been described with reference to the foregoing figures, so as to place the tension bar 28 alternately in an orientation corresponding to the possibility of attaching or detaching the posterior end fold 26 of a printing plate 9 or in an orientation holding this plate 9 wound in the tensioned state over the external surface 8 of the plate cylinder 1, this being through the use of means carried by the tension bar 28 which will be described presently, more particularly with reference to FIGS. 1, 2, 3A, their operation for its part being described with reference to FIGS. 3B, 4 to 7, 10 to 14 and, in one variant, with reference to FIGS. 17A, 17B.

These means are mounted partly securely and partly so that they can move on the longitudinal flat 30 of the tension bar 28, and particularly include a plurality of mutually identical longitudinal flat spring leaves 115, distributed over the longitudinal dimension of the tension bar 28 and retained removably on the flat 30 of the latter.

To this end, the flat 30 is located to the rear of the axis 15 and is turned towards the rear with reference to the direction 10 in all the orientations of the guide bar 28 under normal conditions of operation, particularly in its limiting orientations. The flat 30 includes two plane parts of the same orientation, between which the housing 31 of the torsion bar 32 opens out, namely a part 116 located on the same side of the housing 31 as the edge 38 with respect to which this part 116 is offset in the direction of moving closer with respect to the axis 15, and to which this part 116 is connected via a longitudinal plane shoulder 117, and a part 118 located between the housing 31 and another longitudinal shoulder 119 connecting this part 118 to a longitudinal edge 120 constituting the limit of the external surface 29 of the tension bar 28 in the direction opposite the direction 34.

The parts 116 and 118 of the flat 30 are parallel to one same geometric plane, which is not referenced, passing through the edges 38 and 120 and parallel to the axis 15, with respect to which the part 116 is set further back than the part 118 with respect to this geometric plane, towards the axis 15, and towards which this part 116 has, projecting in the direction 34, a localized longitudinal spur 185 defined by the shoulder 117 and the external surface 29 of the tension bar and the longitudinal edge 38 of which constitutes the limit in the direction 34.

On the part 118 is fixed, numbering as many as there are spring leaves 115, a plate 121 which rests flat over all of its longitudinal extent on the part 118 of the flat 30 and, in two longitudinally end regions 122, straddles the housing 31 of the torsion bar 32 until it comes opposite the part 116, where in a longitudinally intermediate region 123 between the end regions 122 it partially straddles the housing 31 without coming up as far as the part 116.

The plate 121 is delimited by two longitudinal main faces which are parallel to one another and parallel to the axis 15, the only one of which to be described will be the face 124 pointing in the direction of moving away with respect to the axis 15, it being understood that the shape of the other face, in which the plate 121 rests flat on the part 118 of the flat 30 as was indicated above, can be deduced on a parallel with the shape of this face 124.

Owing to suitable dimensioning, the face 124 of the plate 121 is essentially coplanar with the edges 38 and 120 and connects to this edge 120 over all of the longitudinal dimension of the plate 121 via a longitudinal rectilinear edge 125. In a transverse direction 126 going from the edge 120 towards the edge 38, in the end regions 122, the face 124 is connected to a respective longitudinal edge 127 in contact with the part 116 of the flat 30 via a rectangular respective plane longitudinal facet 129 orientated at approximately 45° with respect to the rest of the face 124 so as to move progressively, in the direction 126, closer to the part 116 of the flat 30 while in the intermediate region 123 the face 124 is connected to a longitudinal edge 128 arranged so that it is coplanar with the part 116 of the flat 30, facing the housing 31 of the torsion bar 32, via a rectangular plane longitudinal facet 130 with the same orientation as the facets 129 so as to come progressively closer to this housing 31.

In the longitudinal direction, the face 124 is delimited by transverse edges 131 of the plate 121, mutually connecting the edge 125 and a respective edge 127, and by transverse edges 132 of the plate 121, connecting a respective edge 127 to a respective U-shaped cutout 133 coinciding approximately with the limit of the housing 31 of the torsion bar 32 in a direction 175 opposite the direction 126, and connecting this respective edge 132 to a respective transverse edge 134 of the plate 121, connecting to the edge 128 of the latter and longitudinally delimiting the facet 130.

Operationally, the plate 121 may be considered as forming an integral part of the tension bar 28, on which it defines, via its face 124 of the same orientation as the parts 116 and 118 of the flat 30, and with the edges 38 and 120, a localized flat, locally broken, namely between the transverse edges 132 of the end regions 122 and along the edge 38, which can thus be considered as being exhibited by the tension bar 28 itself.

The plate 121 is secured to the part 118 of the flat 30, against which it rests flat, by means of screws 135, here three in number in the intermediate region 123, and one per end region 122, screwed along a respective axis 136 perpendicular to the region 118 of the flat 30; the axes 136 are located in one same plane, which is not referenced, parallel to the axis 15 and evenly distributed longitudinally. Five of these screws have been illustrated by way of non-limiting example, it being understood that other numbers could be chosen.

Each of these screws 135 has, facing the part 118 of the flat 130, a respective head 137 which bears directly on the face 124 of the plate 121 in the end regions 122 of the latter whereas, in the intermediate region 123, this head 137 bears on the plate 121, not directly, but through the intermediary of a flat surface 138 of a spring leaf 139 shaped in a manner which will be described later. The flat surface 138 is in contact with the heads 137 of the screws 135 in question, and through the intermediary of a respective spacer washer 140, of the same thickness along the respective axis 136 for all the screws 135 in question so as to define, between the surface 138 of the spring leaf 139, and the face 124 of the plate 121, in the region 122 of the latter, a longitudinal passage 141 of constant thickness parallel to the axes 136 of the screws 135, that is to say perpendicular to the surface 138 and to the face 124 of the plate 121 in the intermediate region 123 of the latter. This thickness is approximately equal to and in practice slightly greater than a given thickness, itself constant, of the spring leaf 115.

Longitudinally, the spring leaf 139 is delimited by transverse edges 142 which are mutually spaced longitudinally by a distance which is intermediate between the distance mutually separating the transverse edges 134 of the plate 121 and the distance longitudinally separating the transverse edges 132 of this plate, so that these transverse edges 142 are located facing the U-shaped cutouts 133 of the plate 121.

In the direction 175 opposite the direction 126, the spring leaf 139 is delimited by a longitudinal edge 143 of its surface 138, the position of this edge 143 being unimportant since it is inscribed in a geometric envelope which is cylindrical about the axis 15 with a diameter corresponding to that of the internal surface 13 of the bore 11, which must also be the case for the heads 137 of the screws 135. This edge 143 is arranged facing the edge 125 of the plate 121 in the example illustrated.

Opposite this edge 143 in the direction 126, the surface 138 of the spring leaf 139 is connected via a longitudinal fold 144 to another flat longitudinal surface 145 of this spring leaf, which moves progressively away, in the direction 126, from a coplanar extension of the surface 138, that is to say also of the flat 30, being orientated approximately at 45° with respect to the surface 138. The fold 144 is placed approximately facing the junction of the facet 130 of the face 124 of the plate 121 with the rest of this face 124, in the region 123.

Opposite its connection with the surface 138 along the fold 144, with reference to the direction 126, the surface 145 is itself connected by a longitudinal fold 146 at 180°, approximately semicylindrical about a longitudinal axis which is not illustrated, and also inscribed in the cylindrical envelope defined by the internal surface 13 of the bore 11, to a flat surface 147 which is parallel to it on the side of the flat 30 (See, e.g., FIG. 1A), and is spaced therefrom in the absence of deformation stress in the spring leaf 139, namely in particular in the absence of a spring leaf 115, as will appear later.

This flat surface 147 is then orientated approximately perpendicular to the facet 130 and ends directly facing the latter, opposite its connection with the surface 145 via the fold 146, in a longitudinal edge 148 which, in the absence of elastic deformation stress in the spring leaf 139, is spaced apart from the facet 130 by a distance corresponding approximately to the thickness of a spring leaf 115 to interact with such a spring leaf, in order to hold it on the flat 30 of the tension bar 28 through the use of the plate 121, under conditions which will be described subsequently.

Advantageously, in a manner which is not illustrated, the edge 148 is itself defined by a fold formed by folding the leaf 139 over on itself, flat, at the level of its surface 147.

To interact on the one hand with the posterior end fold 26 of a printing plate 9 and, on the other hand, with the tension bar 28 particularly through the use of the respective spring leaf 139, each spring leaf 115 has a shape which will be described presently.

Generally, this shape is flat and rectangular, defined by two faces 149, 150 which are essentially planar, and mutually parallel, delimiting between them the aforementioned thickness of the spring leaf 115. If the latter is considered to be fixed on the tension bar 28, the faces 149 and 150 are turned respectively towards the rear and towards the front with reference to the direction 10.

The two faces 149, 150 are delimited by two transverse edges 151 mutually spaced longitudinally by a distance identical to that which separates the edges 131 of the plate 121, with which they coincide respectively when the spring leaf 115 is mounted on the tension bar 28. The two faces 149, 150 are moreover delimited by two longitudinal edges 152, 153, turned respectively in the direction 175 opposite the direction 126 and in this direction 126 when the spring leaf 115 is mounted on the tension bar 28, the edge 152 then coinciding with the edge 125 of the plate 121 and with the edge 143 of the surface 138 of the spring leaf 139.

Along this edge 152 are formed as many notches 154 as there are screws 135, with a longitudinal distribution corresponding to that of these screws 135 and a dimensioning chosen as a function of that of the heads 137 of the screws 135 and of the spacer washers 140 so that, in the mounted state on the tension bar 28, the spring leaf 115 is engaged by a end region 155, running along its edge 152, inside the passage 141 and so that the notches 154 respectively match the heads 137 of the screws 135 facing the end regions 122 of the plate 121 and the spacer washers 140 facing the intermediate region 123 of the latter to abut against these heads 137 and these spacer washers 140 respectively, on the one hand in the longitudinal direction, in both directions, and, on the other hand, in the direction 175 opposite the direction 126, which immobilizes the spring leaf 115 in both longitudinal directions and in direction 175 opposite the direction 126 with respect to the tension bar 28; an immobilization of the spring leaf 115 with respect to this tension bar in the direction of the axes 136 is furthermore provided owing to the dimensioning of the passage 141 in relation to the thickness of the spring leaf 115 between its faces 149 and 150.

In a longitudinal region 156 which runs along the end region 155 and therefore coincides with the facet 130 of the face 124 of the plate 121 and with the edge 148 of the surface 147 of the spring leaf 139, the spring leaf 115 has, in its face 149, a longitudinal groove 157 to which there corresponds, to within the thickness of the spring leaf 115 between its faces 149 and 150, a rib 158 in its face 150. This groove 157 and this rib 158 extend over a longitudinal dimension corresponding substantially to the longitudinal dimension separating the transverse edges 142 of the spring leaf 139, between the respective transverse ends 159 of two longitudinal notches 160 formed in the transverse edges 151 of the spring leaf 115 80 that the rib 158 does not form an obstacle to the application of the spring leaf 115 flat via its face 150 against the face 124 of the plate 121 in particular in the end regions 122. Furthermore, the rib 158 forms, on the face 150 of the leaf 115, a projection of thickness at most equal to the distance separating the face 124 of the plate 121 from the region 116 of the flat 30.

In relation to the shape of the facet 130, orientated approximately at 45° with respect to the rest of the face 124 of the plate 121, the groove 157 and the rib 158 are defined along the end region 155 of the spring leaf 115 by a rectangular respective flat longitudinal facet 161, 162 forming a clearance orientated approximately at 45° with respect to the rest of the respectively corresponding face 149, 150 in the end region 155 of the spring leaf 115. Thus, when the spring leaf 115 is inserted via its end region 155 into the passage 141 and abuts via its notches 154 particularly on the spacer washers 140, the facet 162 of the rib 158 rests on the facet 130 of the face 124 of the plate 121 or is placed in the immediate vicinity of this facet 130, and the surface 147 of the spring leaf 139, via its edge 148, is pressed flat on the facet 161 by being orientated at approximately 90° with respect to the latter and forms, for the spring leaf 115, a stop in the direction 126, which locks the spring leaf 115 with respect to the tension bar 28.

Figure 1A:
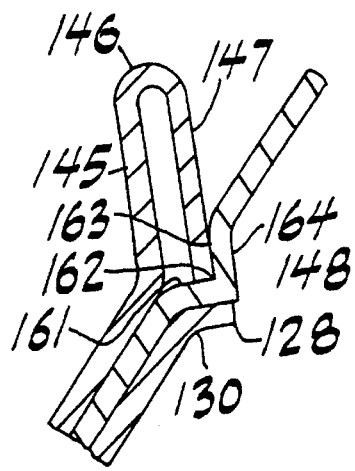
FIG. 1A shows in greater detail the portion of FIG. 1 marked Ia.

Each facet 161, 162 is connected to the rest of the faces 149 and 150 respectively in the direction 126 via a respective facet 163, 164 the shape of which is chosen such that it does not oppose this locking; the two facets 163, 164 for example have a longitudinal rectangular plane shape and are, for example, perpendicular to the facets 161, 162 and consequently attached approximately at 45° to the rest of the faces 149 and 150 respectively (See FIG. 1A).

Preferably, the facet 164 is arranged with respect to the edge 152 of the spring leaf 115 in the same manner as the shoulder 117 with respect to the edge 148 of the surface 147 of the spring leaf 139, which facilitates mounting each spring leaf 115 on the tension bar 28 via the slit 19 starting from the mouth 20 of the latter.

For this purpose, the spring leaf 115 is offered up in the extension of the slit 19, outside the latter, so that its edge 152 is orientated longitudinally and turned in the direction 175 opposite the direction 126, and so that each notch 154 is aligned, with reference to the directions 126 and 175, with the spacer washer 140 or the screw head 137 on which it is respectively intended to fit, as shown in FIG. 3A. Preferably, the tension bar 28 occupies its limiting orientation illustrated in FIG. 1, corresponding to the deflated state of the bladder 49 and to the arms 35, 36 bearing in the direction 34 against the stops such as 37.

By holding the spring leaf 115 in the immediate vicinity of its edge 153 and by displacing it in the direction 175 with respect to the plate cylinder 1, therefore stationary, its end region 155 is then engaged in the slit 19 facing the suitably orientated flat 30, which engages the edge 152 progressively between the surface 147 of the spring leaf 139 and the face 124 of the plate 121 in the end regions 122 of the latter. When, during this displacement, the edge 152 comes into abutment against the surface 147 of the spring leaf 139, the rib 158 of the face 150 of the spring leaf 115 has already negotiated the edge 138 and is placed facing the region 116 of the flat 30, which makes it possible to apply the spring leaf 115, flat, via its face 150, onto the face 124 of the plate 121 in the region 122 of the latter.

Figures 3B, 4:
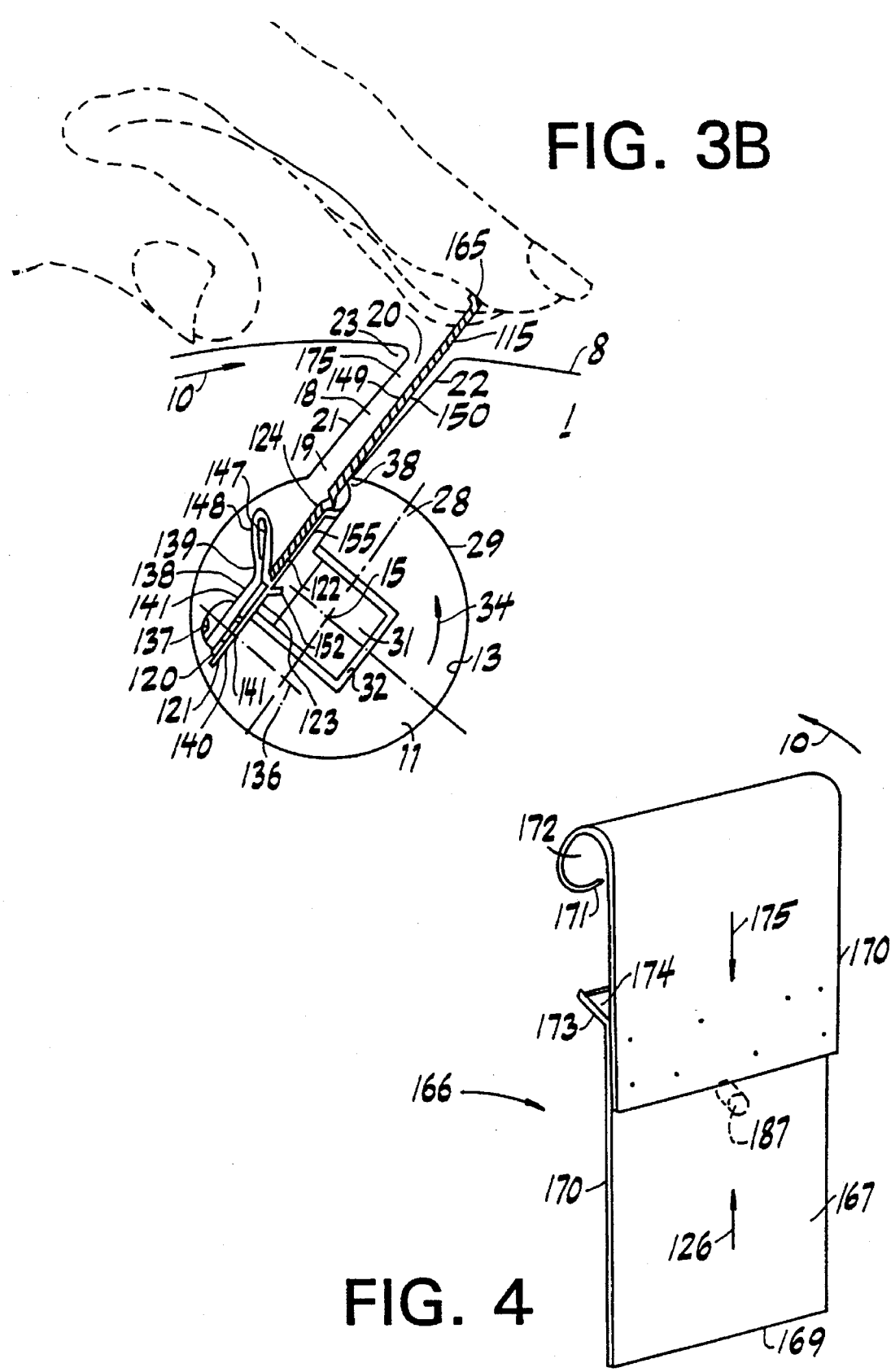
FIG. 4 shows, in a perspective view, a tool for dismantling this leaf.

Next, by manually applying to the edge 153 of the spring leaf 115 a thrust in the direction 175 opposite the direction 126 as shown in FIG. 3B, the surface 147 of the spring leaf 139 is made to retract elastically. The edge 148 of which spring leaf 139 is then pressed onto the face 149 of the spring leaf 115, and the end region 155 of the latter is progressively inserted into the passage 141, the rib 158 of the face 150 engaging between the longitudinal edges 132 of the end regions 122 of the plate 121 and the notches 154 engaging over the spacer washers 140 or the screw heads 127, respectively, until they come into abutment, particularly in the direction 175, against the latter.

Then, the edge 148 of the surface 147, up until now retained by pressing on the face 149 of the spring leaf 115, comes to face the groove 157 of the said spring leaf and, thus released, presses itself approximately at 90° onto the facet 161 by elastic relaxation of the spring leaf 139, which locks the spring leaf 115 in position.

Then, a end region of the latter, which adjoins the edge 153 and which is folded over towards the rear with reference to the direction 10, in the form of a longitudinal hook-shaped rim 165 placed so that it projects from the face 115, is approximately flush with the geometric envelope, which is cylindrical about the axis 2, of the external surface 8 of the plate cylinder 1 as shown in FIG. 1, in a limiting upstream position with reference to the direction 10.

It will be noted that as a complement or as a replacement for the interaction between the notches 154 on the one hand, the spacer washers 140 or the screw heads 137, on the other hand, to give an accurate positioning of the end region 155 of the spring leaf 115 at the end of insertion into the passage 141, recourse may, for this purpose, be had to a longitudinal stop for the rib 158 against the transverse edges 132 delimiting, towards each other, the end regions 122 of the plate 121, using the transverse ends 159 of the notches 160 which are then mutually longitudinally spaced by a distance which is approximately equal to, although slightly less than, the mutual longitudinal spacing of the edges 132, and to a transverse stop for this same rib 158, using its facet 162, in the direction 175 on the facet 130 of the region 123 of the plate 121.

It is noted that this mounting of a spring leaf 115 on the tension bar 28 is performed exclusively from the mouth 20 of the slit 19, that is to say does not require any specific intervention at the tension bar 28, and that any orientation of this tension bar 28 about its axis 15 under normal conditions of use would be suitable, although it is preferred to place it for this purpose in its orientation corresponding to the deflation of the bladder 49.

Figure 5:
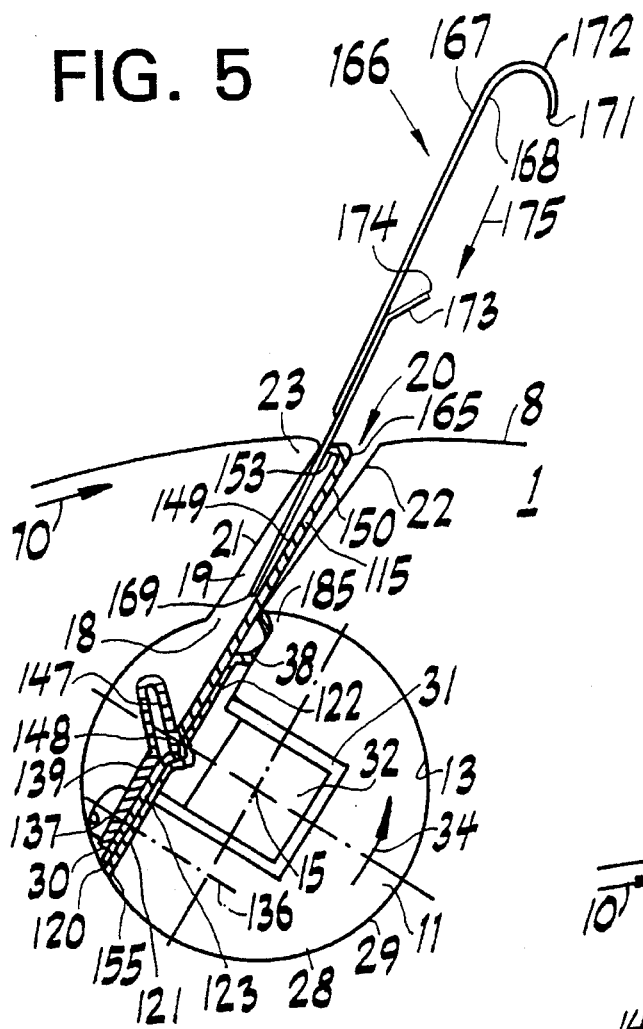
FIGS. 5 to 7 illustrate, in views which are similar to those of FIGS. 1 and 3, the use of this tool for dismantling the leaf.
Figure 6:
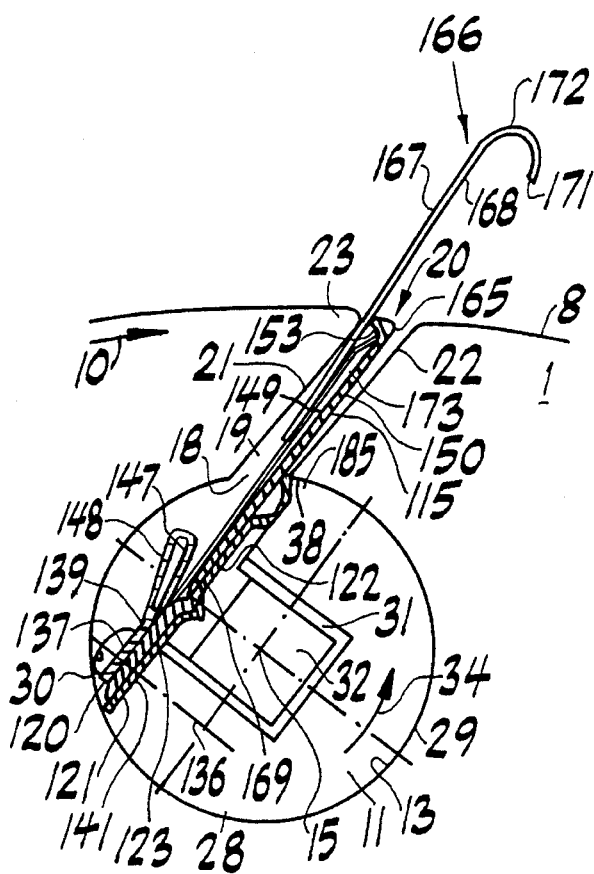
Figure 7:
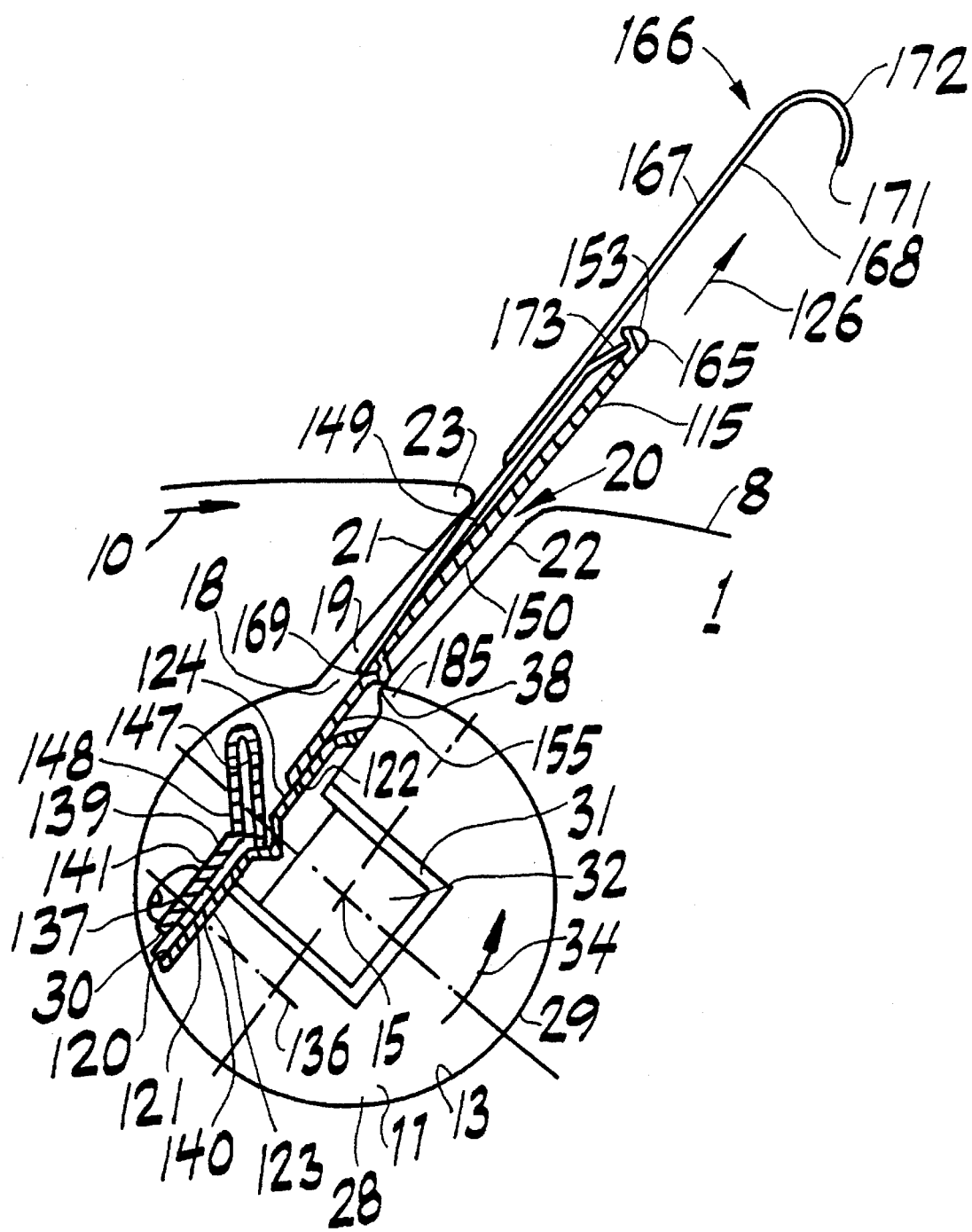

The same is the case upon dismantling the spring leaf 115, which is performed by the use of a tool illustrated in FIG. 4, according to a process illustrated in FIGS. 5 to 7.

To dismantle the spring leaves 115, it is necessary to disengage the facet 161 from the groove 157 in the direction 126 by moving the edge 148 of the spring leaf 139 away.

For this purpose, any flat tool may be engaged between the face 149 of the spring leaf 115 and the upstream side 21 of the slit 19 to apply pressure to a plane longitudinal face 186, which the surface 147 of the spring leaf 139 exhibits between the fold 146 and the edge 148 towards the face 149 of the spring leaf 115, and which constitutes a face for actuating the spring 139, which elastically folds this surface 147 towards the surface 145. When the facet 161 is disengaged, it is then sufficient to apply to the edge 153 of the leaf 115 a traction in the direction 126 to extract the leaf 115 and, then, to put another one back in place.

However, it may be difficult to grip the edge 153 directly and it may be preferred to use, for this purpose, a tool 166 illustrated in FIG. 4 and also visible in FIGS. 5 to 7, which tool is capable both of disengaging the facet 161 and engaging on the hook-shaped rim 165 of the edge 153 of the spring leaf 115 to facilitate its extraction.

For this purpose, the tool 166, which may simply be formed from the flat welded assembly of two small plates, has the overall shape of a rectangular flat plate sufficiently slender to be inserted through the mouth 20 between the spring leaf 115 and the upstream side 21 of the slit 19, but sufficiently thick to be rigid.

It is defined by two faces 167, 168 which are essentially planar, and mutually parallel, and are intended to be turned respectively towards upstream and downstream with reference to the direction 10 during its use, and has a rectilinear insertion edge 169 intended then to be placed longitudinally and to press on the face 186 of the surface 147 of the spring leaf 139 to move the edge 148 of this surface 147 away from the facet 161 of the face 149 of the spring leaf 115.

If the tool 166 is considered in any one whatsoever of these positions of use, illustrated in FIGS. 5 to 7, the insertion edge 169 has a longitudinal dimension substantially corresponding to the longitudinal distance mutually separating the edges 142 of the spring leaf 139 and is connected by its two ends to a respective transverse edge 170, also rectilinear, intended to coincide at least approximately with a respective edge 142.

Opposite their connection with the edge 169, the edges 170 curve, as do the faces 167 and 168, as far as an edge 171 parallel to the edge 169 to constitute a handle 172 which, regardless of the position of the tool 166 during use, remains placed outside the slit 19 at a sufficient distance from the external surface 8 of the plate cylinder 1 to allow easy manipulation of the tool 166. The dimensioning of the latter, for this purpose, lies within the normal capabilities of one skilled in the art who can also choose to replace the handle 172 with other means for taking hold of the tool.

To facilitate the extraction of the spring leaf 115 after releasing the facet 161 via the edge 148, the face 168 of the tool 170 has, secured to it, a projecting longitudinal rim 173 defining a longitudinal shoulder 174 turned in the direction 126. With reference to this direction, this shoulder 174 is spaced from the edge 169 by a distance substantially corresponding to the distance mutually separating, in this direction, if reference is made to the position which the spring leaf 115 occupies when it is locked on the tension bar 28, the hook-shaped rim 165 of this spring leaf 115 and the junction between the facet 161 and the end region 155, which allows the operation which will be described presently with reference to FIGS. 5 to 7.

To detach the leaf 115, assumed initially to be fixed on the tension bar 28, and to extract it through the slit 19, the tool 166 is inserted into this slit using a movement in the direction 175 opposite the direction 126, by turning the edge 169 towards the front with reference to this direction 175 and the face 168, carrying the rim 173, towards the front with reference to the direction 10, as shown in FIG. 5; the tension bar 28 occupies any one whatsoever of its normal orientations of use, preferably its orientation corresponding to a deflation of the bladder 49. When, during this movement, the tool 166, whose edge 169 has progressively folded down the surface 147 of the spring 139 towards the surface 145 of the latter by pressing on the actuating face 186, is inserted via its edge 169 between the edge 148 of the spring leaf 139 and the groove 157 of the face 148 of the spring leaf 115, which makes the edge 148 rest elastically against the face 167 in a end region of the latter, adjoining the edge 169, the shoulder 174 negotiates the edge 153 of the spring leaf 115 and comes into fastened engagement with the hook-forming rim 165, as shown in FIG. 6.

It is then sufficient, as shown in FIG. 7, to apply to the tool 166 a traction in the direction 126 to extract the spring leaf 115, the shoulder 174 of the tool 166 transmitting the traction thus applied to its hook-forming rim 165.

As soon as it is released from the tool 166, the surface 147 of the spring 139 elastically resumes its orientation parallel to the surface 145.

The insertion of a new leaf 115 then takes place in the manner described with reference to FIG. 3B.

In an embodiment variant, illustrated in FIGS. 3A and 4, the interaction between the tool 166 and the spring leaf 115, in order to facilitate the extraction of the latter, may be produced through the use of a hole 186 formed in the spring leaf 115, midway between its transverse edges 151, between the groove 157 and the longitudinal edge 153 and for example also midway from the latter, and of a stud 187 secured to the tool 166, replacing the longitudinal rim 173 of the latter and forming a projection on the face 168 of the latter midway from its transverse edges 170 and at a transverse level such that this stud 187 clips into the hole 186 of the spring leaf 115 when the tool 166, inserted in the manner described previously, comes into a position such that the edge 148 rests on a end region of the face 167, adjoining the edge 169. This stud 187 constitutes, on the face 168 of the tool 166, a shoulder turned in the direction 126 and capable of transmitting to the leaf 115 an extraction force which is applied in this direction to the handle 172 of the tool, which makes it possible to extract this leaf 115 even when the longitudinal hook shaped rim 165 has broken.

Figure 13:
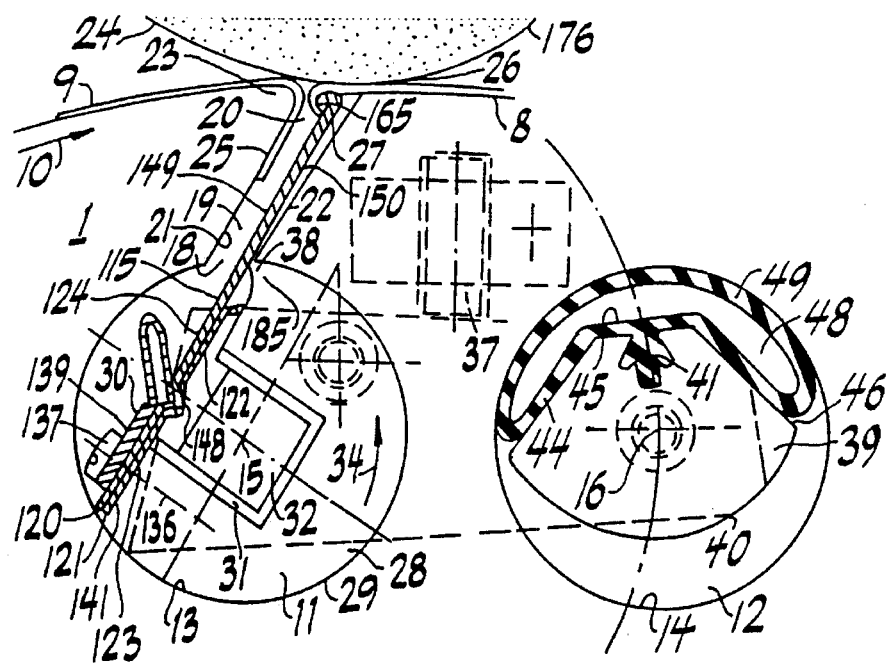
FIG. 13 shows, in a view similar to that of FIGS. 1, 3, 5 to 7, 11, the final phase of fastening, however, before tensioning the plate, with the hook occupying an intermediate position between its front and rear limiting positions.

The leaf 115 is, for its part, dimensioned, in the direction 126, so that in an orientation of the tension bar 28 illustrated in FIG. 13 and corresponding to a partial inflation of the bladder 49 and to an at least approximate coincidence of the edge 38 with the mutual connection of the downstream side 22 of the slit 19 of the internal surface 13 of the bore 11, the hook-shaped rim 165 is flush with the geometric envelope which is cylindrical about the axis 2 of the external surface 8 of the plate cylinder 1 more or less in the middle of the mouth 79; in this state, the spring leaf 115 rests without stress via its face 150 on the face 124 of the plate 121, on the edge 38 and on the junction between the downstream side 22 of the slit 19 and the internal surface 13 of the bore 11, moreover being spaced from the downstream side 22 of the slit 19 which is suitably orientated for this purpose.

In the limiting orientation of the tension bar 28, obtained by maximum inflation of the bladder 49, that is to say the profiled bar 39 bearing on the internal surface 14 of the bore 12, as shown in FIG. 11, the edge 38 is offset in the direction opposite the direction 34 with respect to the junction between the downstream side 22 of the slit 19 and the internal surface 13 of the bore 11, and the spring leaf 115 rests flat, in a state of elastic bending stress, on the downstream side 22 of the slit 19, forming an incline. By means of a phenomenon comparable to an unwinding phenomenon of the spring leaf 115 with reference to the axis 15, its hook-forming rim 165 is then placed so that it projects slightly with respect to the geometric envelope of the external surface 8 of the plate cylinder 1, and in a limiting downstream position with reference to the direction 10; the projection then formed is preferably of the order of 1 to 1.5 mm, these figures being indicated by way of a nonlimiting example.

In the other limiting orientation of the tension bar 28 about the axis 15, illustrated in FIGS. 1 and 14, the spring leaf 115, if it is not stressed, assumes an orientation which for its hook-shaped rim 165 corresponds to an upstream limiting position adjoining the upstream side 21 of the slit 19 at the level of the mouth 20, as has been illustrated in FIG. 1 and in FIG. 14; in this limiting orientation of the tension bar 28, the edge 38 of the latter is offset in the direction 34 with respect to the position described with reference to FIG. 13 or to its position described with reference to FIG. 11, and is placed facing the mouth 18 of the slit 19, more or less in the middle of the latter's width.

The dimensioning, for this purpose, of the spring leaf 115 lies within the normal capabilities of one skilled in the art.

It is recalled that the torsion bar 32 urges the tension bar 28 in the direction 34, that is to say from the first of the limiting orientations described towards the second of the limiting orientations described, in which the levers 35, 36 bear on the stop means such as 37 as shown in FIG. 1.

Under these conditions, a printing plate 9 may be wound and fastened onto the external surface 8 of the plate cylinder 1 semi-automatically, which will be described presently.

Initially, the bladder 49 is deflated, so that the tension bar 28 and the spring leaf 115 occupy their position described with reference to FIG. 1.

With the plate cylinder 1 stopped, the anterior end fold 24 of the printing plate 9 is fastened onto the spur 23, then the plate cylinder 1 is made to rotate in the direction 10 about its axis 2 at a speed which is slower than the speed used for printing. As this rotates, a longitudinal roller 176 mounted so that it can rotate on the frame 3 of the machine about a transverse spindle 177, so as to be pushed elastically onto the external surface 8 of the plate cylinder 1 through the use of the printing plate 9, causes the progressive winding of the latter (See FIG. 10). The elastic bearing of the roller 176 may result from the nature of the latter, this roller for example consisting of an elastically compressible material, in which case its spindle 177 may be fixed with respect to the frame 3 and may result from an elastic mounting of the spindle 177 on the frame 3 using means known to one skilled in the art.

In a manner which is also known to one skilled in the art, the means by which this roller 176 is mounted on the frame 3 allow it to be retracted, particularly to allow the anterior end fold 24 of the printing plate 9 to be engaged on the spur 23, and this roller is made to bear on the printing plate 9 immediately to the rear of this spur 23, with reference to the direction 10, after this engagement, then the plate cylinder 1 is made to rotate in this direction 10.

The bladder 49 remains in the deflated state for most of this rotation, that is to say until the roller 176 again comes sufficiently close to the slit 19 for the end rim 27 of the printing plate 9, thus retained in the wound state on the external surface 8 of the plate cylinder 1, to penetrate into the slit 19 as shown in FIG. 11.

The bladder 49 is then inflated, by the means described with reference to FIGS. 8A, 8B, 9, 9A, 9B or to FIGS. 15, 16, 16A, 16B, which places the hook-forming rim 165 of the spring leaf 115 in its front limiting position, projecting out of the slit 19 as shown in FIG. 11.

By virtue of an appropriate dimensioning of the printing plate 9 between its anterior and posterior end folds 24, 26, in relation to the diameter of the external surface 8 of the plate cylinder 1, on the one hand, and by virtue of a sufficiently small dimensioning of the hook-forming rim 165 taking into account the mutual spacing of the sides 21 and 22 of the slit 19, on the other hand, the posterior end rim 27 of the printing plate 9 is then placed immediately to the rear of the hook-forming rim 165, level with the mouth 20 of the slit 19.

After the rotational movement of the plate cylinder 1 has continued until the mouth 20 of the slit 19 is located facing the roller 176, which tends to make the posterior end rim 27 of the printing plate 9 penetrate elastically into the slit 19, the bladder 49 is deflated, so that at the same time as the posterior end edge 27 of the printing plate 9 tends to penetrate into the slit 19, the hook-forming rim 165, progressing towards its rear limiting position, penetrates into this slit as shown in FIG. 12, first by the spring leaf 115 sliding over the downstream side 22, forming an incline, of the slit 19, then with progressive separation of the leaf 115 with respect to this downstream side 22.

Before the tension bar 28, by pivoting in the direction 34 about the axis 15, has reached its limiting orientation corresponding to the rear limiting position of the hook-forming rim 165, this hook-forming rim comes into abutment in the posterior end fold 26 of the printing plate 9 so that the continuation of the rotation of the tension bar 28 in the direction 34 as far as its limiting orientation illustrated in FIGS. 1 and 14 gives rise to an elastic bending of the spring leaf 115, which is retained in the direction opposite the direction 34 by its hook-forming rim 165 inside the posterior end fold 26 of the printing plate 9, itself retained by its anterior end fold 24 on the spur 23, whereas this spring leaf 115 is moreover pushed coercively in the direction 34 by the edge 38 of the spur 185 of the tension bar 28, as shown in FIG. 14 where the bent state of the spring leaf 115 when the tension bar 28 comes into the limiting orientation in question is illustrated.

Thus, once the bladder 49 has been deflated, the spring leaf 115 transmits to the printing plate 9, wound over the surface 8 of the plate cylinder 1, a circumferential tensile stress between its anterior and posterior end folds 24, 26 under the effect of the torsion bar 32 with a value which is a function of the setting of the stops 37. The transmission of this stress, between the tension bar 28 and the posterior end fold 26 of the printing plate 9, through the use of the elastically bent spring leaf 115, makes it possible to maintain an approximately constant value in the tension applied to the printing plate 9 even if this plate subsequently tends to stretch slightly during printing, according to a known phenomenon.

The roller 176 may then be retracted, for the purpose of printing.

The deflation of the bladder 49 and the passage of the tension bar 28 to its limiting orientation illustrated in FIG. 14 may take place during the slow rotation of the plate cylinder 1 or while the latter is stopped so that the roller 176, then placed facing the mouth 20 of the slit 19, gives assistance to the fastening process, by tending to push the posterior end fold 26 of the printing plate 9 elastically towards the plate cylinder 1.

Figures 17A, 17B:
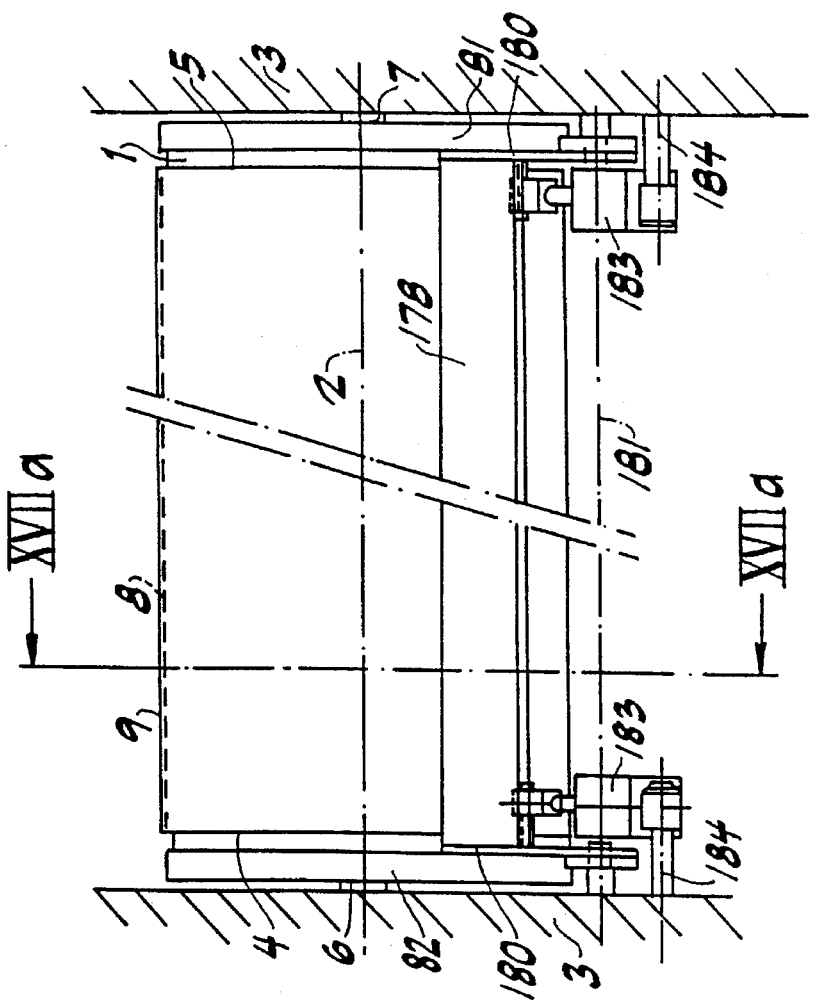
FIG. 17A shows, in a view in transverse section, the interaction of the plate cylinder and of the printing plate already fastened by its anterior edge onto the cylinder and during fastening via its posterior edge, after winding, in a phase corresponding to the one which is illustrated in FIG. 13, with a pusher facilitating this fastening operation, the section being taken along a plane referenced XVIIA—XVIIA in FIG. 17B.
FIG. 17B shows a partial view of this assembly in a radial direction, with reference to the axis of the plate cylinder, referenced XVIIB in FIG. 17A.

However, other means could be used for this purpose, a non-limiting embodiment of which means has been illustrated in FIGS. 17A and 17B.

In the case of this variant, the roller 176 is replaced by a longitudinal pusher 178 extending, like the roller 176, over all the longitudinal dimension of the external surface 8 of the printing cylinder 1.

This pusher 178 is rigid but carries securely, towards the external surface 8 of the plate cylinder 1, a coating 179 of an elastically compressible material like the roller 176, and for example rubber.

In each of its end regions, it is connected securely to a respective lever 180, and the two levers 180, mutually identical, are articulated on the frame 3 of the machine about a common longitudinal axis 181 which is offset with respect to the pusher 178 with reference to a circumferential direction centered on the axis 2.

On each of the levers 180 is articulated, about a longitudinal axis 182 which is offset with respect to the axis 181, the rod of a respective thrust cylinder 183 the body of which is, for its part, articulated on the frame 3 of the machine about a longitudinal axis 184 which is offset with respect to the axes 182 and 181; the axes 182 and 184 are common to both thrust cylinders 183.

By means of a suitable supply to the thrust cylinders 183 of pressurized fluid, particularly of compressed air, the pusher 178 can be brought into an active position, illustrated in solid line in FIGS. 17A and 17B, in which it presses elastically via its coating 179 on the external surface 8 of the plate cylinder 1, through the use of the printing plate 9, while, by interrupting the supply of pressurized fluid, the pusher 179 is moved away from the plate cylinder 1, as far as a retracted position illustrated in chain line in FIG. 17A, in which it is further away from the axis 2 of the plate cylinder 1 than in the active position.

One skilled in the art will easily understand that when, during the winding of the printing plate 9 over the external surface 8 of the plate cylinder 1, the mouth 20 of the slit 19 and the posterior end fold 26 of the printing plate 9 are facing the pusher 178, while in the retracted position, it is possible, by making it pass to the active position simultaneously with making the tension bar 28 pass to its limiting orientation corresponding to the rear limiting position of the hook-forming rim 165, to assist the joint penetration movement of this hook-forming rim 165 and of the posterior rim 27 of the printing plate 9 into the slit 19 under the conditions described in relation to the roller 176.

Once fastening has been achieved, the pusher 178 is returned to its retracted position, which it retains during printing.

Naturally, one skilled in the art will understand that the technical context within which the present invention has been described, as well as the implementation of the latter which has been described, constitute only nonlimiting examples in respect of which numerous variants may be envisaged without thereby in any way departing from the scope of the present invention.

What is claimed is:

1. A printing press comprising:

a frame;

a source of pressurized fluid;

a supply end-fitting connected at least temporarily to the source of pressurized fluid, the supply end-fitting rotationally fixed with respect to a first axis;

a plate cylinder having a supplied end fitting, the plate cylinder and the supplied end fitting disposed in the frame for rotation about the first axis, the plate cylinder having a bladder for operating a mechanism to attach a printing plate to the plate cylinder, the supplied end-fitting connected to the bladder, the supplied end-fitting having a transverse first annular face facing the supply end-fitting and defining the mouth of a first internal pipe for fluidic coupling with the bladder;

the supply end-fitting having a body and a piston, the piston having a transverse second annular face defining a mouth of a second internal pipe for fluidic coupling with the source of pressurized fluid, the second annular face facing the first annular face;

the piston sealedly and longitudinally slidably mounted inside the supply end-fitting body so that it can move between an active position where the second annular face is sealed against the first annular face for coupling the first and second internal pipes, and a rest position in which the piston is comparatively retracted inside the supply end-fitting so that the first and second annular faces are disjoined and the mouths of the first and second internal pipes being exposed to ambient pressure, the piston being forced into the active position when pressurized fluid is supplied from the source and the piston returning to the rest position when pressurized fluid is no longer supplied from the source, the supply end fitting disconnected from the cylinder in the rest position.

2. The device as recited in claim 1 further comprising a spring connecting the piston to the supply-end body, the spring acting to force the piston into the rest position.

3. The device as recited in claim 1 wherein at least one of the annular faces is planar and the other transverse annular face has a projecting annular seal surrounding the respective mouth and capable also of surrounding the other mouth in the active position.

4. The device as recited in claim 1, wherein the bladder is rotatable.

5. The device as recited in claim 1 wherein the source of pressurized fluid is fixed.

6. The device as recited in claim 1 wherein the pressurized fluid is compressed air.

7. The device as recited in claim 1, wherein the piston has a longitudinal axis and the bladder is rotatable about an axis essentially coaxial with the longitudinal axis of the piston.

8. The device as recited in claim 1 wherein the supplied-end fitting is a bearing.

* * * * *